United States Patent [19]

Kahn et al.

[11] 4,086,438
[45] Apr. 25, 1978

[54] AUTOMATIC INTERCONNECTION SYSTEM

[75] Inventors: Daniel W. Kahn; Thomas A. Skidmore, both of Highland Park, Ill.

[73] Assignee: Teletech Corporation, Highland Park, Ill.

[21] Appl. No.: 775,263

[22] Filed: Mar. 7, 1977

[51] Int. Cl.² .............................................. H04M 3/54
[52] U.S. Cl. ................................................ 179/18 BE
[58] Field of Search ..................................... 179/18 BE

[56] References Cited

U.S. PATENT DOCUMENTS 3,867,582  2/1975  Weed et al. ...................... 179/18 BE Primary Examiner—William C. Cooper
Attorney, Agent, or Firm—Vogel, Dithmar, Stotland, Stratman & Levy

[57] ABSTRACT

Described herein is a system for automatically providing interconnections among a plurality of telephone lines serving a subscriber station all under the control of a remote caller. An incoming call to the system is automatically answered, and the incoming line is then connected to an outgoing line either immediately or in response to tone or pulse dialing signals dialed in by the caller. Upon receipt of dial tone on the outgoing line the caller can dial out a call thereon directly from his remote calling location. If dial tone persists on either line for a predetermined time all lines are automatically disconnected. By dialing his own number on the outgoing line and then hanging up, the caller can have the system call him back on the outgoing line, after which he can dial in control signals on the outgoing line to reconnect it to either the original incoming line or another line to dial out calls thereon. By dialing in control signals the caller can add a third line in a conference connection and reset any interconnection for re-calling thereon without hanging up his phone. All interconnections are through a switched-gain repeater amplifier which is automatically controlled to accommodate the various signaling functions associated with the system. If a caller finds the system in use, he can call another incoming line to place a caller-waiting indication on the interconnection. Call-back and conference add-on can be accomplished only with tone-type dialing signals.

45 Claims, 15 Drawing Figures

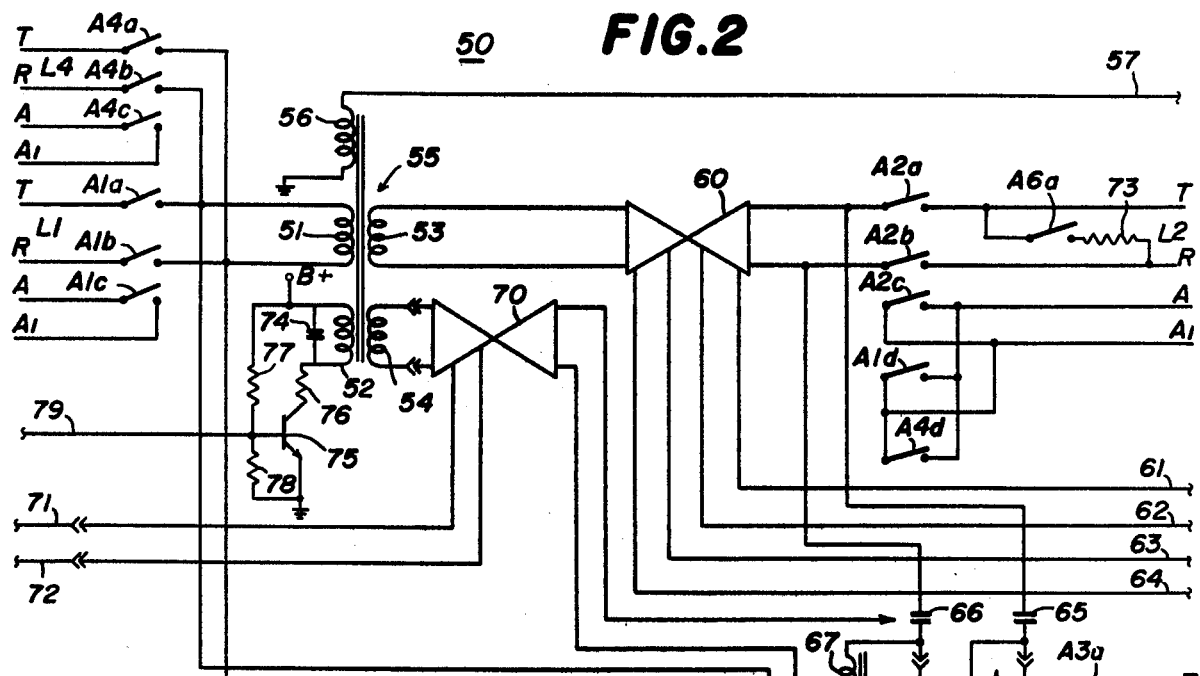
FIG.2
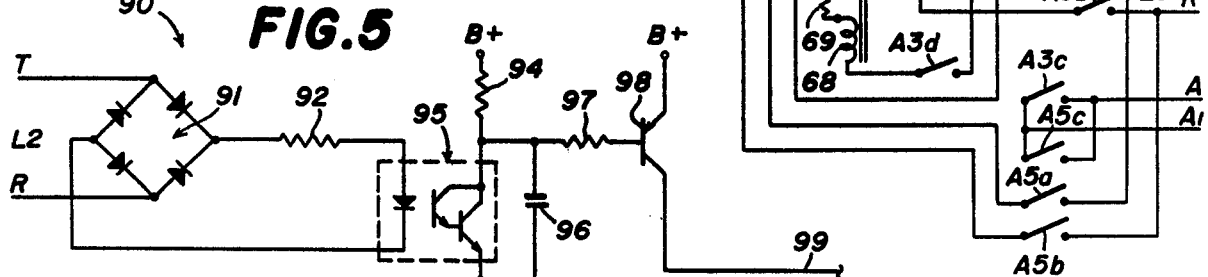
FIG.5
FIG.3
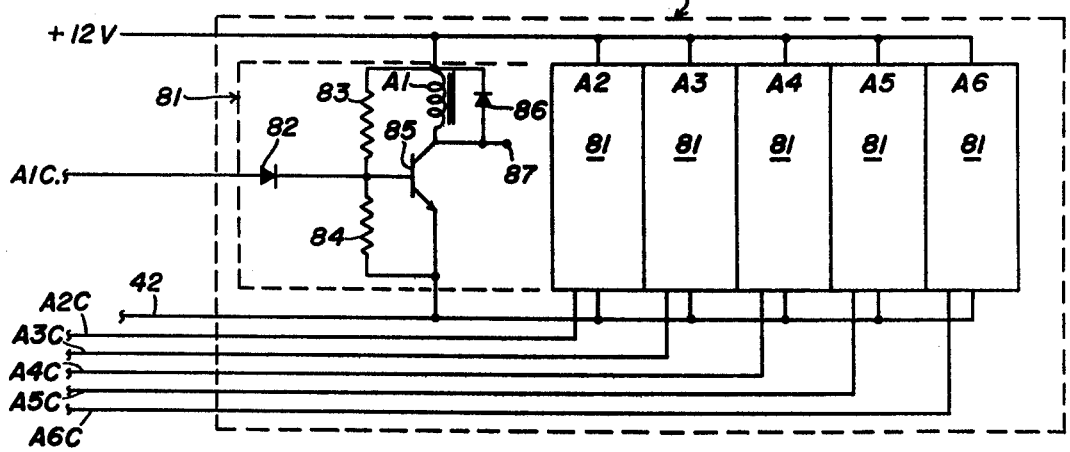
FIG.4
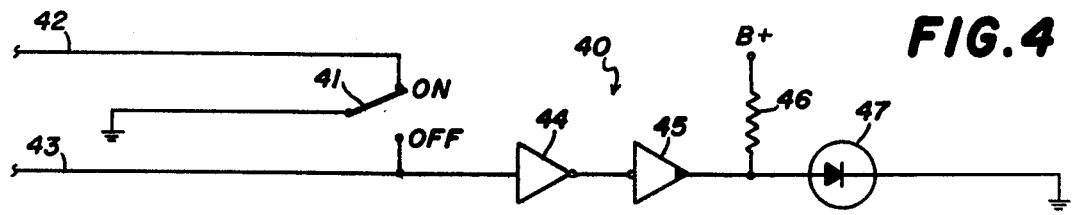

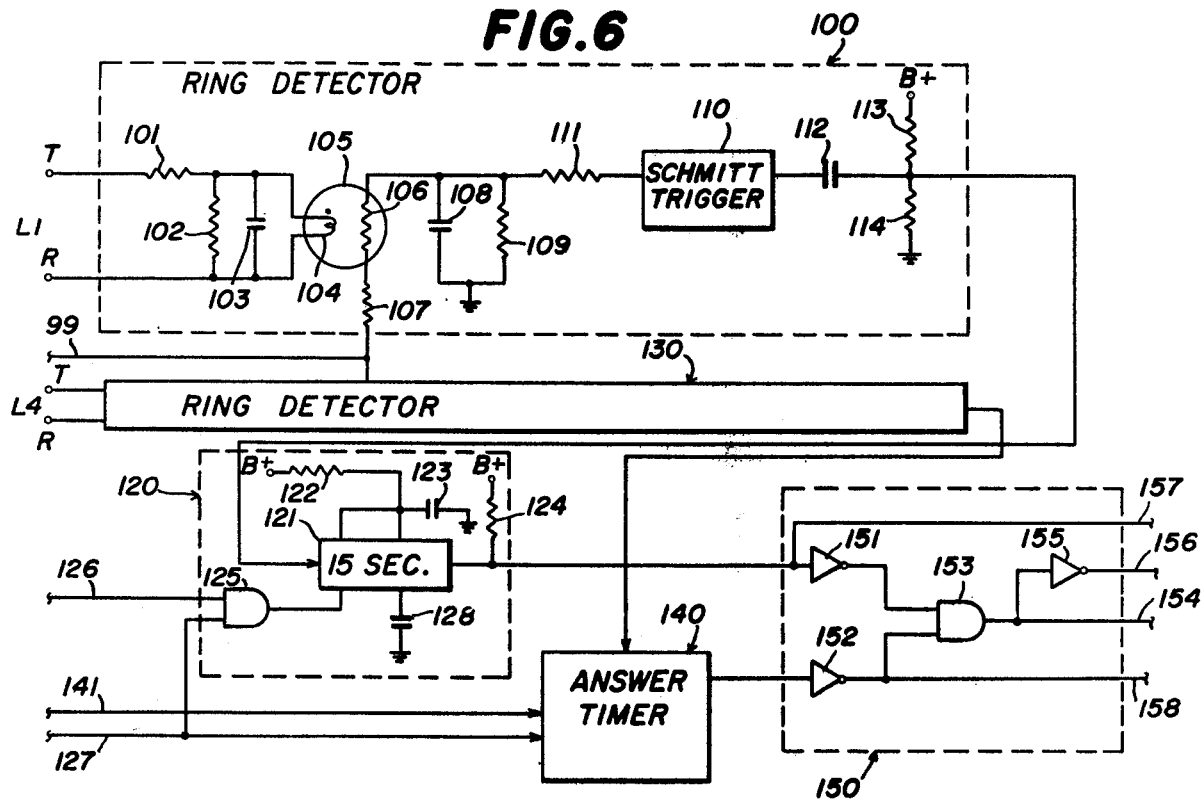
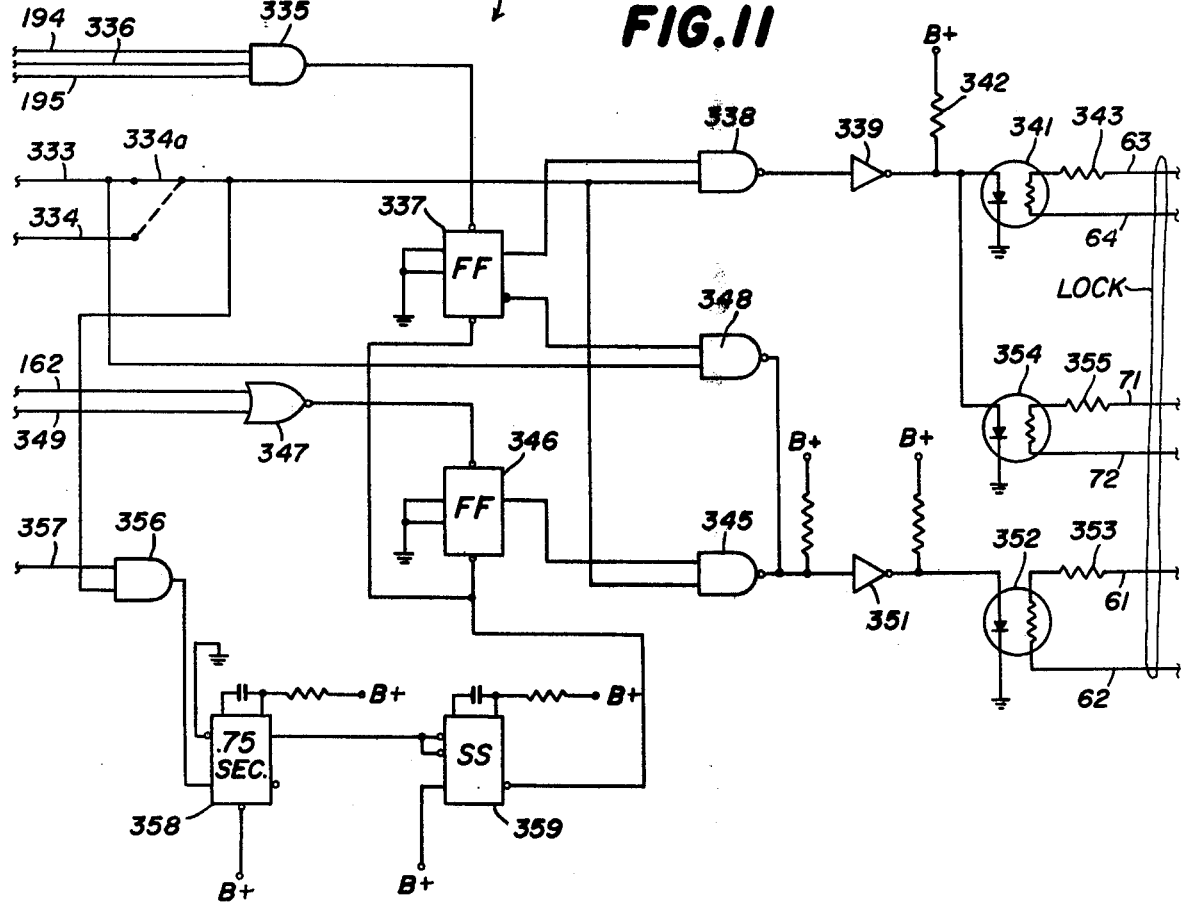

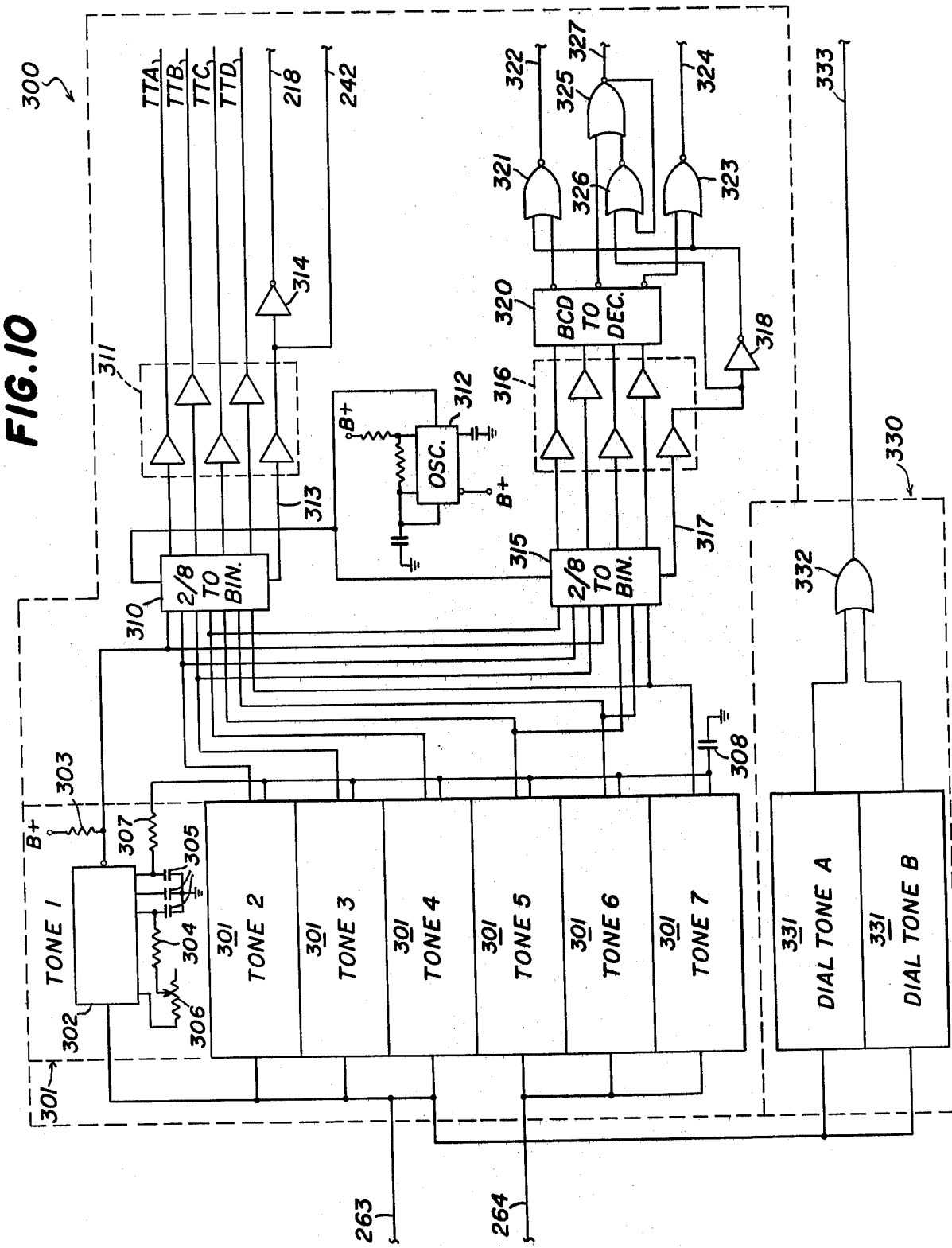

AUTOMATIC INTERCONNECTION SYSTEM

BACKGROUND OF THE INVENTION

The present invention relates to a system for automatically providing interconnections among a plurality of telephone lines serving a subscriber station and, in particular, for providing a means whereby a subscriber can utilize one or more of his lines when he is not physically present at the subscriber station.

A number of prior art systems are available which provide specialized remote control over a telephone line serving a subscriber station. Some such systems permit control and utilization of the telephone line serving a subscriber station from any remote telephone. Two prior art systems are respectively disclosed in U.S. Pat. No. 3,689,702 issued to T. E. McCay on Sept. 5, 1972 and U.S. Pat. No. 3,704,346 issued to L. M. Smith et al. on Nov. 28, 1972.

The McCay system permits an outgoing line to be controlled by a caller calling in on an incoming line, and permits the outgoing line to be repeatedly reset for dialing out repeated calls thereon without the caller having to hang up his telephone. Thus, if a subscriber has a Wide Area Telephone Service (WATS) line, foreign exchange (FX) line or tie line at his office, he can repeatedly utilize that line from any location for the price of a single telephone call to his office. But the McCay system provides no effective means for the subscriber to utilize his office phone from a remote location to make local calls in the area of his office because his system is essentially one-way and provides no means for controlling the "incoming" line from the "outgoing" line.

Furthermore, both of the above-mentioned prior art systems provide for the interconnection of only two subscriber lines, one incoming and one outgoing. If the subscriber has a long distance line, that line is made the outgoing line since it is the one he will usually wish to utilize from a remote location. Outgoing calls can be made on only one line and incoming control signals can only be transmitted over one line. The user does not have the option of using the system to make either long distance or local calls.

Additionally, since only a two-line interconnection is possible in the prior art systems, three-party conference calls cannot be established on those systems. While conference call circuits are, in general, well-known in the telephone art, all conference calls using such prior art circuits must either be established by an operator located at a central location, or require the person placing the conference call to be calling from a specially equipped central office or PBX. The prior art does not provide any means for permitting a user to call into a central station from any remote telephone and set up a conference call without the aid of an operator at the central station.

In utilizing the Smith et al. system in its call-through mode (FIG. 2), dialing signals, whether tone type or pulse type, are decoded and control a dial-out mechanism which pulses the outgoing line to simulate dialing thereon. This is necessary because dialing signals cannot pass through the smith et al. repeater amplifier 31 while dial tone from the outgoing is present. Alternatively, the Smith et al. system could interrupt the dial tone and have the incoming callar wait until the dial tone ceases before dialing out his call, but this is an awkward and unnatural mode of operation. The prior art system provides no convenient means for the user to directly transmit his dialing signals from the incoming line to the outgoing line upon hearing dial tone.

In the above-mentioned prior art systems, if a caller finds the system busy, there is no provision for his notifying the users of the system that there is a caller waiting. While caller-waiting indication means are, in general, known in telephone systems, most indicate that someone is waiting for connection to a specific called line, rather than waiting to use an interconnection facility. Such prior art devices provide for a caller-waiting indication to be automatically generated when an incoming caller receives a busy signal. The caller-waiting indication will be impressed on the interconnection regardless of the identity of the waiting caller. There is no caller selectability of the caller-waiting indication in such systems. This can be quite bothersome when, for example, an executive's telephone conversations are continually being interrupted by caller-waiting indications as a result of subordinates' attempts to reach him.

Furthermore, while the McCay system provides for line-retention, i.e., the dialing of repeated calls on the outgoing line by the user without hanging up his telephone, this feature is available only with the use of tone type dialing signals. Thus, the location from which the caller is calling must have a standard tone dialing telephone or the caller must carry with him a special tone encoder which simulates the tone dialing signals. This limitation constitutes a considerable inconvenience.

The McCay system also provides for the user of a security access code which must be dialed in by the caller in order to effect the interconnection of the incoming and outgoing lines. McCay discloses that his access code can be changed from time to time, but does not disclose how this change is effected. No convenient means is disclosed in the prior art for permitting the access code to be simply and easily changed at will, but only by authorized personnel, nor does the prior art disclose means for selectively bypassing the security code mode of operation.

SUMMARY OF THE INVENTION

The present invention provides an automatic remotely-controlled line interconnection system which overcomes the limitations and disadvantages of the prior art sytems, while additionally affording other unique and important features.

One basic feature of the present invention is the provision of a two-way system which permits automatic interconnection of two lines in such a way that either line can be controlled from the other. This affords the unique advantage that a caller can call the system on a first line from a remote location and dial his own number so as to have the system call him back on a second line, whereupon the caller can then utilize the second line to control the first line.

It is another feature of this invention that the system permits the remote control of interconnections among more than two lines.

In connection with the foregoing feature, the present system permits a caller to call in on one line and selectively make repeated outgoing calls on either of two other lines without hanging up his telephone instrument.

In connection with the multiple-line interconnection feature, the present system also permits a caller to call the system and have the system call him back and then utilize the call-back line to control repeated outgoing calls on two other lines including the original incoming line.

In connection with the multiple-line interconnection feature, the present invention also permits a caller from a remote location to automatically set up a conference call among the several lines.

Also in connection with the multiple-line interconnection feature, the present invention permits incoming calls to the system to be made on more than one line. One of these lines can be utilized for the generation of a caller-waiting indication. Thus, if a user calls the system on one line and receives a busy signal, he can then call the other line and have a caller-waiting indication placed on the ongoing conversation. The caller-waiting indication line can be a private line, the number of which would be given out only to select individuals.

It is another important feature of the present invention that either of two lines can be used for both incoming and outgoing calls, the system permitting tone dialing signals to be transmitted directly through the system from an incoming line to an outgoing line upon the appearance of a dial tone on the outgoing line. The system does not require a special dial-out mechanism when accessed from a tone dialing telephone.

It is another important feature of this invention that the system permits the repeated dialing out of calls on an outgoing line from either a tone dialing or a rotary pulse dialing telephone instrument, without the caller having to hang up the telephone between calls.

Still another feature of the present invention is the provision of code control means which will permit an interconnection to be completed only upon the dialing in of a predetermined access code. Manually-operated key-controlled code switch means permit anyone who has the key to change the code at will or switch the system to a bypass mode wherein no security code is necessary to access the system.

The foregoing features are attained and it is an important object of the present invention to attain these features by providing an automatic interconnection system for use at a telephone subscriber station served by first and second subscriber lines each connected to a telephone system central office, said interconnection system comprising line interconnection means coupled to the first and second lines and operable for seizing and releasing the lines and establishing interconnections therebetween, access means coupled to the first line and to said line interconnection means and responsive to access signals on the first line for causing said line interconnection means to seize the first and second lines and establish an interconnection therebetween, and reset means coupled to the second line and to said line interconnection means and responsive to reset signals on the second line for causing said line interconnection means to release only the first line and then to re-seize the first line and reestablish the interconnection between the first and second lines.

Further features of the invention pertain to the particular arrangement of the parts of the automatic interconnection system whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 2 is a more detailed circuit diagram, partially schematic and partially in block, of the coupling and amplifier circuit of FIG. 1;

FIG. 3 is a diagram, partially schematic and partially in block, of the relay drive circuit of FIG. 1;

FIG. 4 is a diagram, partially schematic and partially in block, of the power-on control and indicator circuit of the present invention;

FIG. 5 is a schematic circuit diagram of the idle line detector circuit of FIG. 1;

FIG. 6 is a diagram, partially schematic and partially in block, of the ring detector, answer timer and line identification circuits of FIG. 1 for lines L1 and L4;

FIG. 10 is a diagram, partially schematic and partially in block, of the tone decode and dial tone decode circuits of FIG. 1;

FIG. 11 is a diagram, partially schematic and partially in block, of the amplifier lock-down circuit of FIG. 1;

DESCRIPTION OF THE PREFERRED EMBODIMENT

General Description of Operation

Figure 1:
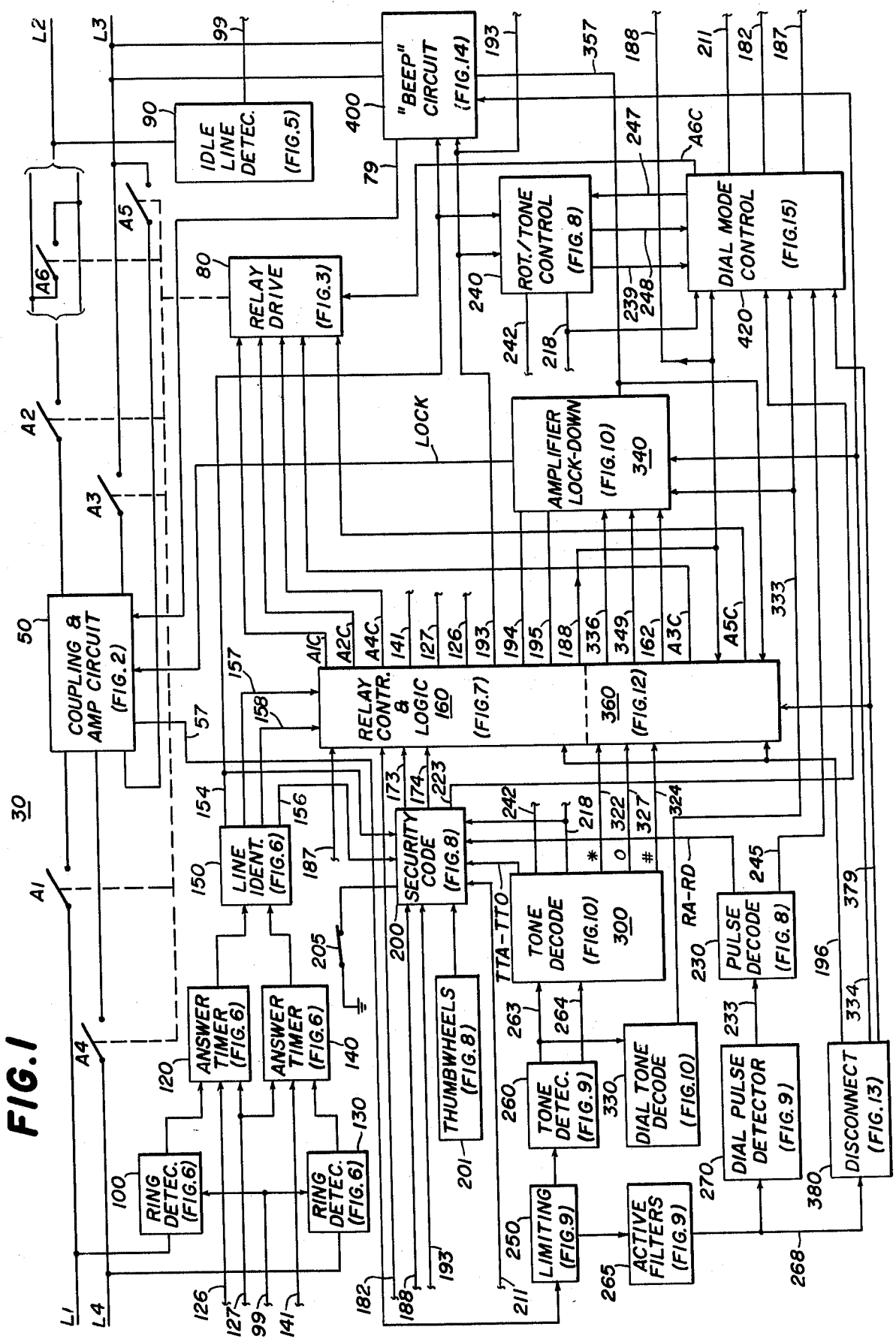
FIG. 1 is a functional block diagram of the automatic interconnection system of the present invention.

Referring to FIG. 1 of the drawings, there is shown an automatic interconnection system, generally designated by the numeral 30, which includes a coupling and amplifier circuit 50 for providing audio interconnections among a plurality of telephone lines serving a base subscriber station, the lines being respectively designated as L1, L2, L3 and L4. While each of these telephone lines has been diagramatically indicated by a single conductor in FIG. 1, it will be understood that each of these lines actually consists of a Tip and a Ring conductor, as is indicated in an expanded portion of line L2, and as will be more fully described hereinafter. Connection of the lines L1-L4 to the coupling and amplifier circuit 50 is controlled by a plurality of relays A1, A2, A3, A4, A5 and A6, which are operated by a relay drive circuit 80. Preferably, at least one of the telephone lines L1-L4 is a standard local telephone line, and at least one of the lines L1-L4 is a long distance telephone line such as a direct or tie line, a WATS (Wide Area Telephone Service) line, an FX (foreign exchange) line or the like. In the preferred embodiment of the invention, two of the lines such as L1 and L3 may be local lines and the other two lines L2 and L4 may be long distance lines. Broadly, the automatic interconnection system 30 provides means for gaining access to and controlling selected ones of the lines via others of the lines from any remote location which is provided with a tone dial telephone and, on a more limited operational basis, from any remote location which has either a rotary dial or a tone dial telephone instrument.

In order to access the system 30, a subscriber calls the telephone number of line L1. The telephone company central office will apply ringing signals to the line L1 in standard fashion. These ringing signals are detected by the ring detector 100. If the system is already in use and the long distance line L2 is busy, this condition will be detected by the idle line detector 90 which generates a signal on the conductor 99 to disable the ring detector 100. If the line L2 is idle, the ring detector 100 applies an output signal to the answer timer 120, which also receives input signals on the conductors 126 and 127 to respectively indicate the conditions of the lines L2 and L4. If both the latter lines are free, the answer timer 120 applies an output signal to the line identification circuit 150.

In like manner, the system could be accessed via the line L4 by the subscriber simply calling the telephone number of the line L4. The ringing signals thereon would be detected by the ring detector 130 which, in the absence of an inhibiting signal on the conductor 99, will apply an output signal to the answer timer 140. The answer timer 140 is also connected to the conductors 127 and 141 for respectively sensing the conditions on the lines L2 and L1 and, if these lines are idle, the answer timer 140 applies an output signal to the line identification circuit 150. Upon receipt of signals from either the answer timer 120 or the answer timer 140, the line identification circuit 150 produces a plurality of output signals.

A signal is supplied via the conductor 156 to the security code circuit 200. On the conductors 157 and 158, signals are applied to the relay control and logic section 160, which is connected via conductors 188 and 193 to the security code circuit 200, and also produces an output signal on either the conductor A1C or A4C, depending upon which of the lines L1 or L4 is being used, the signal being applied to the relay drive circuit 80 for closing the contacts of either the relay A1 or A4 for connecting the line L1 or L4 to the coupling and amplifier circuit 50 and, in effect, "answering" the incoming call on that line. The line identification circuit 150 also applies a signal via the conductor 154 to the security code circuit 200 and to the "BEEP" circuit 400, the latter circuit in turn applying a signal via the conductor 79 to the coupling and amplifier circuit 50 for impressing an audible signal on the access line L1 or L4 to let the caller know that he has accessed the system 30.

The security code circuit 200 is connected to a bank of three thumbwheel switches 201 and a lockswitch, which is preferably a keyswitch 205. A three-digit security code is loaded in the security code circuit 200, which circuit operates to prevent operation of the relay A2 for connecting the long distance line L2 to the coupling and amplifier circuit 50, unless the caller first dials in the three-digit security code. The security code can be changed at will, by simply opening the keyswitch 205 and resetting a new code on the thumbwheel switches 201 and then reclosing the keyswitch 205. Thereafter, changing of the position of the thumbwheel switches 201 will not affect the security code loaded in the circuit 200.

Thus, as the next step, the caller dials in the three-digit security code which is coupled via the conductor 57 to the limiting circuit 250. If the caller is using a tone dialing telephone, the tone signals are coupled directly to the limiting circuit 250. If he is using a rotary dial telephone, the sounds of the "clicks" of the dial switch are transmitted to the limiting circuit 250. It will be noted that the security code circuit 200 is also connected by conductors 211 and 223 to the dial mode control circuit 420, which is in turn connected to the conductor 188 and is connected by conductors 239, 247 and 248 to the rotary/tone control circuit 240, the latter circuit being also connected to the conductors 154 and 193.

Referring first to the situation where the incoming caller is using a rotary dial telephone, the dial clicks, after being limited in the limiting circuit 250, are applied through active filters 265 and via a conductor 268 to a dial pulse detector 270, and thence via a conductor 233 to a pulse decode circuit 230. In response to the ringing signals on the incoming line, the line identification circuit 150 has transmitted a signal on the conductor 154 to the rotary/tone control circuit 240, the latter transmitting a signal on the conductor 239 to the dial mode control circuit 420, which in turn transmits a signal on the conductor 211 to the security code circuit 200 for conditioning the security code circuit 200 to receive security code signals from the pulse decode circuit 230. The pulse decode circuit 230 counts the dial pulses in each dialed digit and converts them into a BCD representation of the digit, which is transmitted over the lines RA-RD to the security code circuit 200. The security code circuit 200 compares the dialed-in digits with the stored security code and, if the correct security code has been dialed in, transmits a signal on the conductor 174 to the relay control and logic section 160, which in turn transmits a signal on the conductor A2C to the relay drive circuit 80 which operates to close the contacts of the relay A2 and connect the line L2 to the coupling and amplifier circuit 50, which provides an audio coupling between the line L2 and the incoming line L1 or L4. This interconnection will evoke a dial tone on line L2 from its central office which will be heard by the caller on line L1 or L4, and he may then dial in the telephone number of the party he wishes to call.

If the incoming caller has a tone dialing telephone, the tones are transmitted through the limiting circuit 250 to the tone detector 260 which separates the low and high frequency components of each tone dial signal and transmits them respectively via conductors 263 and 264 to the tone decode circuit 300. As the first tone dialing signal is received by the tone decode circuit 300, it transmits signals on the conductors 218 and 242 to the rotary/tone control circuit 240, the signal on the conductor 218 also being transmitted to the dial mode control circuit 420. The signal on the conductor 218 causes removal of the signal on the conductor 239 and thereby disables the dial mode control circuit 420. This disables the entire rotary dial mode of operation and removes the signal on the conductor 211 which results in conditioning of the security code circuit 200 to receive security code signals from the tone decode circuit 300.

The tone decode circuit 300 transmits BCD representations of the tone dial signals via the lines TTA-TTD to the security code circuit 200, which operates in the same manner as was described above in connection with the rotary dial mode of operation for causing closure of the contacts of the relay A2 if the correct security code has been dialed in. It will be noted that each time one of the relays A1, A2 or A4 is operated, the relay control and logic section 160 also transmits signals on the conductors 126, 127 and 141 to the answer timers 120 and 140 to indicate the conditions of these relays.

The system 30 can be configured to permit access thereto without the use of a security code, by setting the thumbwheel switches 201 to load into the security code circuit 200 the code "000". When the security code circuit 200 is so arranged, it will be immediately responsive to the signal on the conductor 154 upon reception of ringing signals of the incoming call for applying an output signal on the conductor 173 to the relay control and logic section 160, which signal has the same effect as the signal on the conductor 174 described above, i.e., it causes actuation of the relay drive circuit 80 to close the contacts of the relay A2.

The dial tone from the line L2 is transmitted via the conductor 57 to the limiting circuit 250 and thence to the tone detector 260. Since the dial tone comprises two low frequency components, these components are transmitted via the conductor 263 to the dial tone decode circuit 330, which in turn transmits a signal on the conductor 333 to the dial mode control circuit 420 and to the amplifier lock-down circuit 340. If a caller is calling from a rotary dial telephone, the signal on conductor 333 actuates a timer in the dial mode control circuit 420 which, after a predetermined time period (e.g., one second) transmits a signal on conductor A6C to the relay drive circuit 80 for operating the relay A6 to close the contacts thereof for placing a holding circuit across the Tip and Ring of line L2. The dial mode control circuit 420 also transmits a signal on the conductor 182 to the relay control and logic section 160 for inhibiting the signal on conductor A2C and reopening the contacts of relay A2, thereby disconnecting the line L2 from the coupling and amplifier circuit 50. Thus, after the one-second time period, the caller will no longer hear the dial tone on line L2 and this will be his signal that he can commence dialing the number of the telephone which he wishes to reach.

The dialing clicks are transmitted through the dial pulse detector 270 to the pulse decode circuit 230 as described above. For each pulse, the pulse decode circuit 230 transmits a signal on the conductor 245 to the dial mode control circuit 420, which responds to each pulse signal on the conductor 245 for momentarily inhibiting the signal on conductor A6C and momentarily open the contacts of the relay A6, simulating the opening and closing of a rotary dial switch on the line L2. When a caller has completed dialing his outgoing call, the dial mode control circuit 420 responds to the absence of incoming dial pulses for a predetermined time period by removing the signal from the conductor 182, in response to which the relay control and logic section 160 operates to reclose the contacts of relay A2 via conductor A2C. The dial mode control circuit 420 also inhibits the signal on conductor A6C for reopening the contacts of the relay A6. The incoming caller on line L1 or L4 will now hear the ring-back signals from line L2 and, when the called party answers, conversation may commence in the usual manner.

Upon receipt of the ring detection signal on the conductor 154, the security code circuit 200 also transmits a signal on the conductor 223 to the dial mode control circuit 420. This signal is necessary because when no security code is used the dial mode control circuit 420 does not receive any rotary or tone dialing information with which to determine whether or not to be in the rotary dial mode or in the tone dial mode. Therefore, as described above, the dial mode control circuit 420 would normally, after one second, cause reopening of the contacts of the relay A2 removing the line L2 dial tone from the coupling and amplifier circuit 50. This one-second period might not be sufficient time for a caller from a tone dialing telephone to begin to dial his outgoing call. Thus, when the system 30 is operating without a security code, the signal on the conductor 223 causes the dial mode control circuit 420 to generate its output signals on conductors 182 and A6C for closing the contacts of relay A6 and opening the contacts of relay A2 after 5 seconds rather than 1 second. This allows sufficient time for the tone dialing caller to begin dialing his outgoing call. It also means that a rotary dial caller must wait five seconds rather than one second for a dial tone to cease so that he can begin dialing his outgoing call.

Referring now to dialing from a tone dialing telephone, it is noted that the coupling and amplifier circuit 50 includes a two-way switched-gain repeater amplifier to which all of the lines L1 through L4 are connected, the amplifier being capable of amplifying signals passing through it in either direction. If signals are simultaneously applied from opposite directions, the amplifier will normally amplify the stronger of the two signals and attenuate the weaker. Thus, when a dial tone is present on line L2, that is the strongest signal, and the amplifier will normally be incapable of adequately amplifying the incoming caller's tone dialing signals on line L1 or L4 for transmitting them to line L2. To correct this situation, the amplifier is forced to amplify signals on the calling line L1 or L4, which is accomplished by the amplifier lock-down circuit 340. After the caller has finished entering the security code (or immediately upon detection of the ringing signals if there is no security code), the relay control and logic section 160 responds to the signals on conductors 173 or 174 for transmitting a signal on conductor 195 to the amplifier lock-down circuit 340. When a dial tone subsequently appears on the line L2, the dial tone decode circuit 330 transmits a signal on the conductor 333 to the amplifier lock-down circuit 340, as described above, and the amplifier lock-down circuit 340, in the presence of signals on both the conductors 195 and 333, transmits a signal on the LOCK line to the coupling and amplifier circuit 50 for locking the amplifier thereof to amplify tone dialing signals from the calling line.

In this manner, the calling party can immediately, upon hearing the dial tone from line L2, begin dialing in his tone dialing signals and they will be transmitted to the line L2. Thereafter, the call is completed in the usual manner. When the caller dials in his first tone dialing signal, the central office on line L2 will detect the dialing signal and terminate the dial tone in a wellknown manner. When the dial tone ceases, the signal on conductor 333 will be removed and, therefore, the amplifier lock-down circuit 340 will operate to remove the signal on the LOCK line and the amplifier of the coupling and amplifier circuit 50 will be returned to its normal mode of operation, wherein it amplifies the loudest signals supplied thereto, which now are the tone dialing signals on the calling line.

When the incoming caller has completed his call, he hangs up his telephone. After about thirty seconds, the central office will present a new dial tone on the incoming line L1 or L4, which is coupled via the conductor 57 to the limiting circuit 250 and thence to the active filters 265 and via the conductor 268 to the disconnect circuit 380. In response to ten consecutive seconds of dial tone, the disconnect circuit 380 transmits a signal on the conductor 196 to the relay control and logic section 160 which responds by effecting opening of the contacts of the relays A2 and A1 or A4. The system 30 is now ready to receive another incoming call. The ten-second time period of the disconnect circuit 380 serves to distinguish a hang-up dial tone from a dial tone on an outgoing line such as line L2, which latter dial tone is also transmitted to the disconnect circuit 380 via the conductor 268, but which is never permitted to persist for as long as 10 seconds.

If the caller encounters a busy or no-answer condition or merely wishes to place another call, he may do so without hanging up and calling back. If he is calling from a rotary dial telephone, he simply dials the number "9". The nine "clicks" are detected by the dial pulse detector 270 and counted by the pulse decode circuit 230, the latter circuit transmitting a signal on the conductor 245 to the dial mode control circuit 420, which in turn transmits a signal on the conductor 187 to the relay control and logic section 160, which operates to open the contacts of the relay A2 for about 2 seconds and then reclose them to bring up a new dial tone on the line L2. The signal on the conductor 187 also internally resets the dial mode control circuit 420 for receiving another rotary dial call.

If the caller is calling from a tone dialing telephone, he presses the "*" button, and the corresponding tone is detected by the tone detector 260 and decoded by the tone decode circuit 300, which transmits a signal on the conductor 322 to the relay control and logic section 360, which operates to open the contacts of the relay A2 for about two seconds and then reclose them to bring up a new dial tone on the line L2. The relay control and logic section 360 also causes the relay control and logic section 160 to transmit a signal on the conductor 194 to the amplifier lock-down circuit 340, which in turn transmits signals on the LOCK line to the coupling and amplifier circuit 50 for again locking down the amplifier thereof to amplify tone dialing signals on the calling line.

It is an important feature of the present invention that after a caller has completed a call through the automatic interconnection system 30 via the long distance line L2, he can from his remote calling location add a third party to the call if he is calling from a tone dialing telephone. The caller simply presses the "#" button of his telephone, and the corresponding tone signal is detected by the tone detector 260 and decoded by the tone decode circuit 300, which transmits a signal on the conductor 324 to the relay control and logic section 360, which transmits a signal on the conductor A3C to the relay drive circuit 80 for closing the contacts of the relay A3, thereby connecting the line L3 to the coupling and amplifier circuit 50, which effects a conference connection among the calling line and the lines L2 and L3 and, in effect, answers line L3. When a dial tone appears on line L3, it is decoded by the dial tone decode circuit 330, which transmits a signal on the conductor 333 to the amplifier lock-down circuit 340, as described above. The relay control and logic section 360 also transmits a signal on the conductor 336 to the amplifier lock-down circuit 340, which proceeds to lock down the amplifier of the coupling and amplifier circuit 50 in the same manner as was described above. If the caller wishes to disconnect the third party on line L3, he simply again presses the "#" button, and a signal is again transmitted from the tone decode circuit 300 via the conductor 324 to the relay control and logic section 360, which responds by removing the signal on the conductor A3C for reopening the contacts of the relay A3 and disconnecting the line L3. A new third party conference call can then be added by again pressing the "#" button, in the same manner as was described above.

It is another important feature of the present invention that a caller from a tone-dialing telephone can realize benefits from using the automatic interconnection system 30 from any remote location, even though it is outside the calling area of the base subscriber station. Thus, the caller can access the system 30 from a long distance remote location and use the system 30 to make repeated calls in the calling area of the base subscriber station, all for the price of a single long distance call to the system 30. To use this feature, the caller dials the number of line L1 to access the automatic interconnection system 30, in the manner described above. This incoming call is detected and answered by the system 30, which connects the calling line to the long distance line L2, with or without the use of a security code, all as has already been explained. After receiving a dial tone from line L2, he tone dials the number of the telephone he is calling from and then hangs up. He has, in effect, called himself, and the long distance telephone network starts processing the call and routing it from the location of the automatic interconnection system 30 to his calling location. Because he has hung up his telephone, the call he has made to himself will reach him in about five to ten seconds, and since he has hung up, it will not reach a busy line. His phone will ring, whereupon he picks up the telephone and hears a silent line.

He immediately presses the "0" button and the corresponding tone signal is detected by the tone detector 260 and decoded by the tone decode circuit 300, which transmits a signal on the conductor 327 to the relay control and logic section 360, which also receives an oscillator input signal from the "BEEP" circuit 400 via the conductor 357. The caller then also presses the "*" button before a timer in the relay control and logic section 360 times out (about 1-1/2 seconds), and the tone decode circuit 300 responds by transmitting a signal on the conductor 322 to the relay control and logic section 360, which in turn responds to the sequential reception of the signals on the conductors 327 and 322 to cause the relay control and logic section 160 to open the contacts of the relay A1 for about two seconds and then reclose them to evoke a dial tone on the line L1.

The relay control and logic section 360 also transmits a signal on the conductor 162 to the amplifier lock-down circuit 340. As a dial tone on the line L1 is heard by the calling party on the line L2, it is also decoded by the dial tone decode circuit 330, which transmits a signal on the conductor 333 to the amplifier lock-down circuit 340. This latter circuit, in the presence of the signals on the conductors 162 and 333, transmits a signal on the LOCK line to the coupling and amplifier circuit 50 for locking the amplifier thereof in a configuration such that it will amplify tone dialing signals transmitted thereto on the line L2, which now becomes the calling line, permitting the caller to dial out local calls on the line L1 through the system 30. After the first touch-tone dialing digit has been dialed, the central office of the line L1 breaks the dial tone, the signal on the conductor 333 ceases and, therefore, the amplifier lock-down circuit 340 removes the signal on the LOCK line, permitting the amplifier of the coupling and amplifier circuit 50 to return to its normal condition wherein it amplifies the loudest signals supplied thereto, which are now the tone dialing signals on line L2. The call then progresses in the usual manner.

When he has completed his call, the caller can then dial out a new call on the line L1 without hanging up, by simply again pressing "0" and then "*" for again reopening the contacts of the relay A1 for about two seconds and then reclosing them to evoke a new dial tone to permit a new call on the line L1. When he has completed his calls, the caller simply hangs up and, eventually a dial tone will appear on line L2, which will reset the system through the disconnect circuit 380, in the manner described above.

It is another significant feature of the present invention that the caller can call the automatic interconnection system 30 on the long distance line L2 and, instead of being connected to the local line L1, be connected to the line L3, which may be another long distance line, whereby he may make repeated long distance calls from his remote location for the price of a single initial call to the system 30. To use this feature, the caller proceeds in the same manner as described above for the call-back-/local, but after the system 30 calls him back, instead of pressing "0" and "*" to reset line L1, he presses "0" and then "#". The tone decode circuit 300 responds by transmitting signals on the conductors 327 and 324 to the relay control and logic section 360, which in turn causes the relay control and logic section 160 to open the contacts of the relay A1 to disconnect the line L1, and to initiate a sequence whereby a signal is inhibited from the conductor A5C for about two seconds and then transmitted over that conductor to the relay drive circuit 80 for closing the contacts of the relay A5 to connect the line L3 to the incoming side of the coupling and amplifier circuit 50, thereby evoking a dial tone on the line L3. The relay control and logic section 360 also transmits a signal on the conductor 349 to the amplifier lock-down circuit 340, which in the presence of the dial tone signal on the conductor 333 will operate to lock down the amplifier of the coupling and amplifier circuit 50 to amplify touchtone dialing signals received over the line L2. The call may then proceed in the same manner as was described above with respect to the call-back/local operation and, when the call is completed, additional calls may be placed by the caller again pressing the "0" and "#" buttons, in response to which the relay control and logic section 360 will cause the contacts of the relay A5 to be open for about two seconds and then reclose to evoke a new dial tone on the line L3. It will be noted that the caller can alternately switch back and forth between the call-back/local and call-back/long distance modes without hanging up by simply pressing either "0*" or "0#". When his calls are completed, the system is reset through the disconnect circuit 380 in the manner described above.

If the caller to the automatic interconnection system 30 encounters a busy signal when dialing line L1 or L4, this means that someone else is using the system 30. It is another important feature of the present invention that the caller can notify the person using the system that someone else is waiting to use it. To use this feature, the caller hangs up his telephone after hearing a busy signal and then redials the number of line L3 of the system 30. The "BEEP" circuit 400 responds to the ringing signals on the line L3 and transmits an audible signal on the conductor 79 to the coupling and amplifier circuit 50 for impressing the audible signal on all of the lines connected thereto and signaling the user that another caller is waiting. Preferably, the "BEEP" circuit 400 contains timing circuitry which will limit the frequency with which the "BEEP" circuit 400 may be actuated to induce the audible signal on the conversation in progress, so that it does not become annoying. The "BEEP" circuit 400 may also respond to the ringing signals on the line L3 for placing an impedance across the Tip and Ring of the line L3 to, in effect, "answer" the call thereon. When the call is answered, the ring back signals to the caller will cease, thereby indicating to him that his call has gotten through to the system 30.

Since the line L3 is also used for the conference call feature, a separate line could be used for the caller-waiting indication, by simply connecting the "BEEP" circuit 400 to that additional line. In this way the caller-waiting feature would not be disabled by a conference call in progress on line L3.

It will be noted that the disconnect circuit 380 also operates to reset the automatic interconnection system 30 when it is initially turned on and powered up.

While all of the principal interconnections among the various circuit blocks have been illustrated in FIG. 1, it will be understood that there are additional interconnections which have not been shown either because they relate to optional features or are otherwise unnecessary for the foregoing general description of operation. All such interconnections are, however, described in detail hereinafter.

Detailed Description of Circuitry

In the drawings: for all flip-flops and timers the upper and lower output terminals are, respectively, the Q and $\overline{Q}$ outputs; a small dot just inside a gate indicates that the operative signal at that terminal is an inhibit signal.

Referring first to FIG. 4 of the drawings, there is illustrated a power indicating circuit, generally designated by the numeral 40, which includes a single-pole double-throw switch 41 having a grounded movable contact and a pair of fixed contacts respectively designated "ON" and "OFF", and respectively connected to conductors 42 and 43. The conductor 43 is also connected through an inverter 44 and a buffer amplifier 45 to the anode of an LED 47, the cathode of which is grounded. The anode of the LED 47 is also connected through a resistor 46 to B+.

Referring now to FIG. 2 of the drawings, the coupling and amplifier circuit 50 includes a five-winding audio transformer, generally designated by the numeral 55, and comprising windings 51, 52, 53, 54 and 56. One terminal of the winding 56 is connected to ground and the other terminal thereof is connected to the conductor 57. The terminals of the winding 51 are respectively connected through the contacts A1a and A1b of the relay A1 to the Tip ("T") and Ring ("R") conductors of the line L1. The line L1 also may be provided with auxiliary leads A and $A_1$ which may be connected to key telephone equipment and are interconnected by contact A1c of the relay A1, so that when the relay is closed, lights will be illuminated under pick-up buttons in the key telephones. The contacts A1d of relay A1 provide the same function for auxiliary leads associated with line L2. The terminals of the winding 51 are also respectively connected via the contacts A4a and A4b to the Tip and Ring conductors of line L4, contacts of A4c and A4d respectively bridging auxiliary leads of lines L4 and L2. The terminals of the winding 51 are also respectively connected through the contacts A5a and A5b of the relay A5 to the Tip and Ring conductors of the line L3, contacts A5c of the relay A5 bridging auxiliary leads of the line L3.

The terminals of the winding 53 are connected to one side of a two-way switched-gain repeater amplifier 60, which may be of the type manufactured by Lorain Products Corp., No. 402VRM. Basically, the amplifier 60 amplifies the louder of the two signals (one from each side) entering it at any one time, and attenuates the softer in its normal mode of operation. The amplifier 60 may, however, be selectively switched so that it will ignore the relative loudness of the signals and will look to only one side or the other and amplify only the signals entering from that side. For this purpose, the amplifier 60 has four control terminals which are respectively connected to conductors 61, 62, 63 and 64.

The Tip and Ring conductors of the line L2 are respectively connected through the contacts A2a and A2b of the relay A2 to the other side of the amplifier 60, the relay A2 having contacts A2c bridging the auxiliary leads of the line L2. This other side of the amplifier 60 is also connected through coupling capacitors 65 and 66 and the contacts A3a and A3b of the relay A3 to the Tip and Ring conductors of the line L3, the relay A3 also having contacts A3c bridging the auxiliary leads of the line L3. Also connected across the Tip and Ring conductors of the line L3 through contact A3d of the relay A3 is a terminating network including a series combination of coils 67 and 68 and resistor 69.

Instead of having both the lines L2 and L3 connected to the right-hand side of the amplifier 60, the coupling and amplifier circuit 50 may alternatively be provided with an additional amplifier 70, identical in construction to the amplifier 60. The terminals of the two input-output ports and the control terminals of the amplifier 70 are preferably all provided with plug connections so that the amplifier 70 can selectively be plugged into the coupling and amplifier circuit 50, as desired. The left-hand side of the amplifier 70 is preferably adapted to plug into the terminals of the transformer winding 54, while two of the control terminals are adapted to respectively plug into conductors 71 and 72. The terminals at the other side of the amplifier 70 respectively plug into the Tip and Ring conductors of the line L3 between the relay A3 contacts therein and the terminating circuit connected thereacross. For this purpose the terminating circuit and the capacitors 65 and 66 may be unplugged from the Tip and Ring conductors of the line L3.

Connected across the Tip and Ring conductors of the line L2 through contact A6a of the relay A6 is a dialing resistor 73. Connected across the terminals of the transformer winding 52 is a capacitor 74, these terminals also being respectively connected through resistors 76 and 77 to the collector and base of a transistor 75, the emitter of which is grounded. A resistor 78 is connected in the base-emitter circuit of the transistor 75, the base also being connected to the conductor 79. The junction between the resistor 77 and the transformer winding 52 is also connected to a source of B+ potential, preferably +5 VDC.

In FIG. 3 of the drawings there is illustrated the relay drive circuit 80, which includes six identically constructed relay drivers, each generally designated by the numeral 81, respectively corresponding to the relays A1 through A6, and being respectively connected to the conductors A1C-A6C. Each of the relay drivers 81 is also connected to the conductor 42 and to a source of +12 VDC potential. Since the relay drivers 81 are identically constructed, only the one associated with the relay A1 will be described in detail. The conductor A1C is connected through a diode 82 to the base of a transistor 85, the emitter of which is connected to the conductor 42, and the collector of which is connected to the terminal 87 and to one terminal of the coil of relay A1, the other terminal of which is connected to +12 VDC. A resistor 83 is connected between the base of transistor 85 and the +12 VDC supply, while a resistor 84 is connected between the base and emitter of transistor 85. The coil or relay A1 is shunted by a transient-suppression diode 86.

Referring to FIG. 5 of the drawings, the idle line detector circuit 90 includes a four-diode rectifier bridge, generally designated by the numeral 91, which is connected across the Tip and Ring conductors of the line L2, the output terminals of the bridge 91 being connected through a resistor 92 to the LED input terminals of an opto-isolator 95, which may be of the type manufactured by Monsanto Company, No. 4N33. The opto-isolator 95 consists of an LED coupled to a photo Darlington transistor coupled pair, the emitter of the output transistor being grounded and the collector thereof being connected through a resistor 94 to B+. Connected across the output terminals of the opto-isolator 95 is a capacitor 96, the collector output terminal being connected through a resistor 97 to the base of a transistor 98, the emitter of which is connected to B+ and the collector of which is connected to the conductor 99.

Referring now to FIG. 6 of the drawings, the ring detector 100 includes an opto-isolator 105 including a neon lamp 104, the input terminals of which are respectively connected to the Tip and Ring conductors of the line L1 through a resistor 101. Connected in parallel across the terminals of the neon lamp 104 are a resistor 102 and a capacitor 103. The opto-isolator 105 also includes a photo-resistor 106, one terminal of which is connected through a resistor 107 to the conductor 99, and the other terminal of which is connected through a parallel-connected capacitor 108 and resistor 109 to ground and through a resistor 111 to the input of a Schmitt trigger 110. The output of the Schmitt trigger 110 is connected through a capacitor 112 to the junction between resistors 113 and 114, the other terminal of the resistor 113 being connected to B+ and the other terminal of the resistor 114 being grounded, with the capacitor 112 and resistors 113 and 114 acting as a differentiator.

The capacitor 112 is also connected to the answer-timer circuit 120. More particularly, the capacitor 112 is connected to the trigger input of an integrated circuit timer 121, which may be of the type manufactured by Exar Integrated Systems, Inc., No. XR-2556, and which type of timer may hereinafter be referred to as a "2556 timer". The time period of the timer 121 is set by an external resistor 122 which is connected to B+ and capacitor 123 which is grounded. The output terminal of the timer 121 is connected through a resistor 124 to B+. The reset terminal of the timer 121 is connected to the output of an AND gate 125, the input terminals of which are respectively connected to the conductors 126 and 127. The timer 121 is also connected through a capacitor 128 to ground.

The ring detector 130 which is connected to the Tip and Ring conductors of the line L4 and the associated answer timer 140 are, respectively, identical in construction and operation to the ring detector 100 and the answer timer 120 and, therefore, the detailed circuitry of the ring detector 130 and answer timer 140 have not been shown. One input terminal of the AND gate of the answer timer 140, however, is connected to the conductor 141 rather than to the conductor 126.

The output terminals of the answer timers 120 and 140 are respectively connected to inverters 151 and 152 in the line identification circuit 150, the outputs of the inverters 151 and 152 being respectively connected to the input terminals of an AND gate 153, the output terminal of which is connected to the conductor 154 and is also connected through an inverter 155 to the conductor 156. The input terminal of the inverter 151 is also connected to the conductor 157 and the output terminal of the inverter 152 is also connected to the conductor 158.

Figure 7:
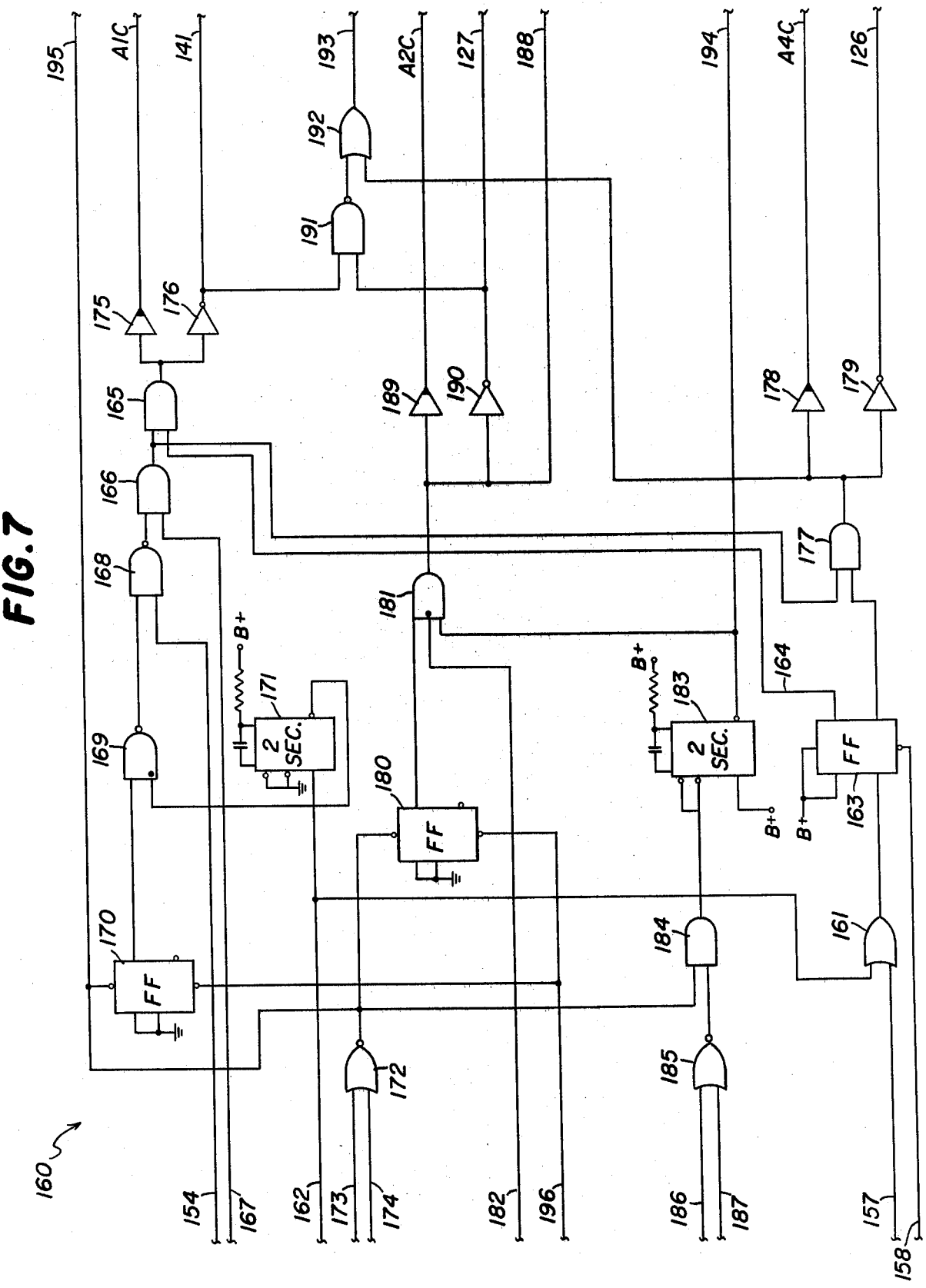
FIG. 7 is a diagram, partially schematic and partially in block, of the section 160 of the relay control and logic circuit of FIG. 1.

Referring now to FIG. 7 of the drawings, the section 160 of the relay control and logic circuit is illustrated. Conductor 157 is connected to one input terminal of an OR gate 161, the other input terminal of which is connected to the conductor 162, and the output terminal of which is connected to the clock input terminal of an integrated circuit flip-flop 163, which may be of the type manufactured by Signetics Corporation, No. N7474, which type of flip-flop may hereinafter be referred to as a "7474 flip-flop". The data inputs of the flip-flop 163 are connected to B+ and the clear terminal thereof is connected to the conductor 158. The Q output of the flip-flop 163 is connected to one input of an AND gate 165, the other input of which is connected to the output of an AND gate 166. One input of the AND gate 166 is connected to a conductor 167, and the other input thereof is connected to the output of a NAND gate 168, the inputs of which are respectively connected to the conductor 154 and the output of a NAND gate 169. One input of the NAND gate 169 is connected to the Q output of a 7474 flip-flop 170 and the other input thereof is connected to the Q̄ output of an integrated circuit timer 171. The timer 171 is a monostable multivibrator, which may be of the type manufactured by Signetics Corporation, No. N74121, which type of timer may hereinafter by referred to as a "74121 timer". The time period of the timer 171 is determined by an external capacitor connected between two of the timing terminals and a resistor connected from one of the timing terminals to B+. The logic terminals of the timer 171 are grounded and the trigger input thereof is connected to the conductor 162.

The set terminal of the flip-flop 170 is connected to the output of a NOR gate 172, the inputs of which are respectively connected to the conductors 173 and 174. The output of the AND gate 165 is connected to the inputs of a buffer amplifier 175 and an inverter 176, the outputs of which are respectively connected to the conductors A1C and 141.

The output of the AND gate 166 is also connected to one input of an AND gate 177, the other input of which is connected to the Q̄ output of the flip-flop 163. The output of the AND gate 177 is connected to the inputs of a buffer amplifier 178 and an inverter 179, the outputs of which are respectively connected to the conductors A4C and 126. The output of the NOR gate 172 is also connected to the set terminal of a 7474 flip-flop 180, the Q output of which is connected to one input of a three-input AND gate 181. A second input of the AND gate 181 is connected to the conductor 182, and the third input is connected to the Q̄ output of a 74121 timer 183. The trigger input of the timer 183 is connected to B+ and the logic inputs are connected to the output of an AND gate 184. One input of the AND gate 184 is connected to the output of the NOR gate 172 and the other input is connected to the output of a NOR gate 185, the inputs of which are respectively connected to conductors 186 and 187.

The output of the AND gate 181 is connected to the conductor 188 and to the inputs of a buffer amplifier 189 and an inverter 190, the outputs of which are respectively connected to the conductors A2C and 127. The output of the inverter 190 is also connected to one input of a NAND gate 191, the other input of which is connected to the output of the inverter 176 and the output of which is connected to one input of an OR gate 192. The other input of the OR gate 192 is connected to the output of the AND gate 177 and the output thereof is connected to the conductor 193. The Q̄ output of the timer 183 is also connected to the conductor 194 and the output of the NOR gate 172 is also connected to the conductor 195. The clear terminals of the flip-flops 170 and 180 are connected to the conductor 196.

Figure 8:
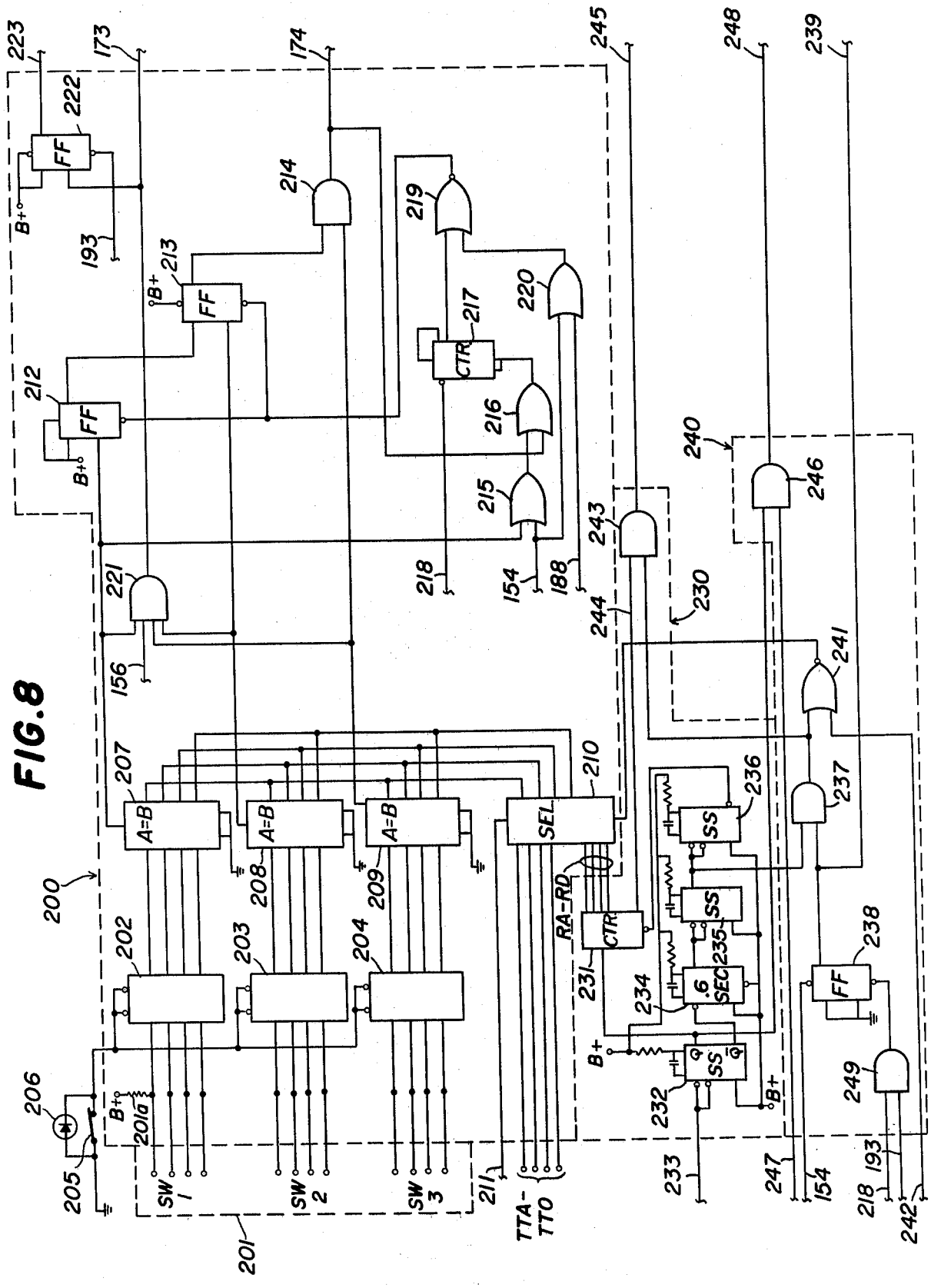
FIG. 8 is a diagram, partially schematic and partially in block, of the security code and rotary pulse decode and rotary/tone control circuits of FIG. 1.

Referring now to FIG. 8 of the drawings, the security code circuit 200 is illustrated. The three thumbwheel switches 201 are respectively designated SW1, SW2 and SW3, each having four output terminals for producing a four-bit BCD complement code representation of the digit dialed therein. The output terminals of the thumbwheel switches 201 are respectively connected to the data input terminals of three identically-constructed integrated circuit latches 202, 203 and 204. Each of the latches 202–204 may be a quadruple bistable latch of the type manufactured by Signetics Corporation, No. N7475. The clock inputs of each of the latches 202–204 are connected through a normally-closed keyswitch 205 to ground, the switch 205 being shunted by a transient-suppression diode 206. Each of the output conductors of the thumbwheel switches 201 is connected through a pull-up resistor 201a to B+, so that the switches 201 apply straight BCD to the latches 202–204.

The four outputs of each of the latches 202–204 are respectively connected to the four "A" inputs of three identically-constructed four-bit magnitude comparators 207, 208 and 209. Each of the comparators 207–209 may be of the type manufactured by Texas Instruments Inc., No. 7585. The A < B and the A > B terminals of each of the comparators 207–209 are grounded. The B inputs of each of the comparators 207–209 are connected to the outputs of a two-input data selector 210. The data selector 210 is a logical implementation of a four-pole double-throw switch, and may be of the type manufactured by Signetics Corporation, No. 74157. One set of four input terminals of the data selector 210 are connected to the conductors TTA-TTD for receiving data from the tone decode circuit 300, and the other set of four inputs are connected to the conductors RA-RD for accepting data from the pulse decode circuit 230. The select terminal of the data selector 210 is connected to the conductor 211 and, depending upon the signal at this terminal, the data selector 210 will transmit to the output terminals thereof either the data on the conductors TTA-TTD or the data on the terminals RA-RD.

The A=B output terminal of the comparator 207 is connected to the clock input of a 7474 flip-flop 212, the Q output of which is connected to the data input of a 7474 flip-flop 213, the clock input of which is connected to the A=B output of the comparator 208. The Q output of the flip-flop 213 is connected to one input of an AND gate 214, the other input of which is connected to the A=B output of the comparator 209, the output of the AND gate 214 being connected to the conductor 174. The A=B output of the comparator 207 is also connected to one input of an OR gate 215, the other input of which is connected to the conductor 154 and the output of which is connected to one input of an OR gate 216. The other input of the OR gate 216 is connected to the output of the AND gate 214, the output of the OR gate 216 being connected to the clear terminals of a counter 217. The counter 217 is a high-speed, monolithic four-bit binary counter, which may be of the type manufactured by Signetics Corporation, No. N7493. The trigger input of the counter 217 is connected to a conductor 218, and the output thereof is connected to one input of a NOR gate 219, the other input of which is connected to the output of an OR gate 220. The two inputs of the OR gate 220 are respectively connected to the conductors 154 and 188. The output of the NOR gate 219 is connected to the clear terminals of the flip-flops 212 and 213.

The A=B outputs of the comparators 207-209 are respectively connected to three of the four inputs of an AND gate 221, the fourth input of which is connected to the conductor 156 and the output of which is connected to the conductor 173 and to the trigger input of a 7474 flip-flop 222, the clear terminal of which is connected to the conductor 193 and the Q output of which is connected to the conductor 223.

The conductors RA-RD connected to one set of data input terminals of the data selector 210 are also connected to the four BCD outputs of a decade counter 231 of the pulse decode circuit 230. The decade counter 231 is an integrated circuit synchronous counter, which may be of the type manufactured by Signetics Corporation, No. N74160. The clock input of the decade counter 231 is connected to the Q output of a 74121 timer 232, the trigger input of which is connected to B+ and the data inputs of which are connected to the conductor 233, the $\overline{Q}$ output of the timer 232 being connected to the trigger input of an integrated circuit retriggerable timer 234, which may be of the type manufactured by Signetic Corporation, No. N74123. This type of timer may hereinafter be referred to as a "74123 timer". The time period of the retriggerable timer 234 is set at approximately 600 ms. by an external capacitor and resistor, and the clear terminal and data input terminal are externally tied together and connected to B+. The Q output of the retriggerable timer 234 is connected to the data inputs of a 74121 timer 235, the Q output of which is connected to the data inputs of still another 74121 timer 236. The $\overline{Q}$ output of the timer 236 is connected to the clear terminal of the decade counter 231. The decade counter 231 has a carry output which goes high when the counter has reached a count of "9". This output is connected by a conductor 244 to one input of an AND gate 243, the other input of which is connected to the output of an AND date 237, the output of the AND gate 243 being connected to the conductor 245.

The AND gate 237 forms a part of the rotary/tone control circuit 240, and has one input thereof connected to the Q output of the timer 235 and the other input thereof connected to the Q output of a 7474 flip-flop 238, the set terminal of which is connected to the conductor 154. The Q output of the flip-flop 238 is also connected to the conductor 239. The output of the AND gate 237 is also connected to one input of a NOR gate 241, the other input of which is connected to the conductor 242, and the output of which is connected to the strobe input of the data selector 210 in the security code circuit 200.

The Q output of the timer 232 in the pulse decode circuit 230 is also connected to one input of an AND gate 246 in the rotary/tone control circuit 240, the other input of the AND gate 246 being connected to a conductor 247, and the output thereof being connected to a conductor 248. The rotary/tone control circuit 240 also includes an AND gate 249, having two inputs respectively connected to the conductors 193 and 218 and an output connected to the clear terminal of the flip-flop 238.

Figure 9:
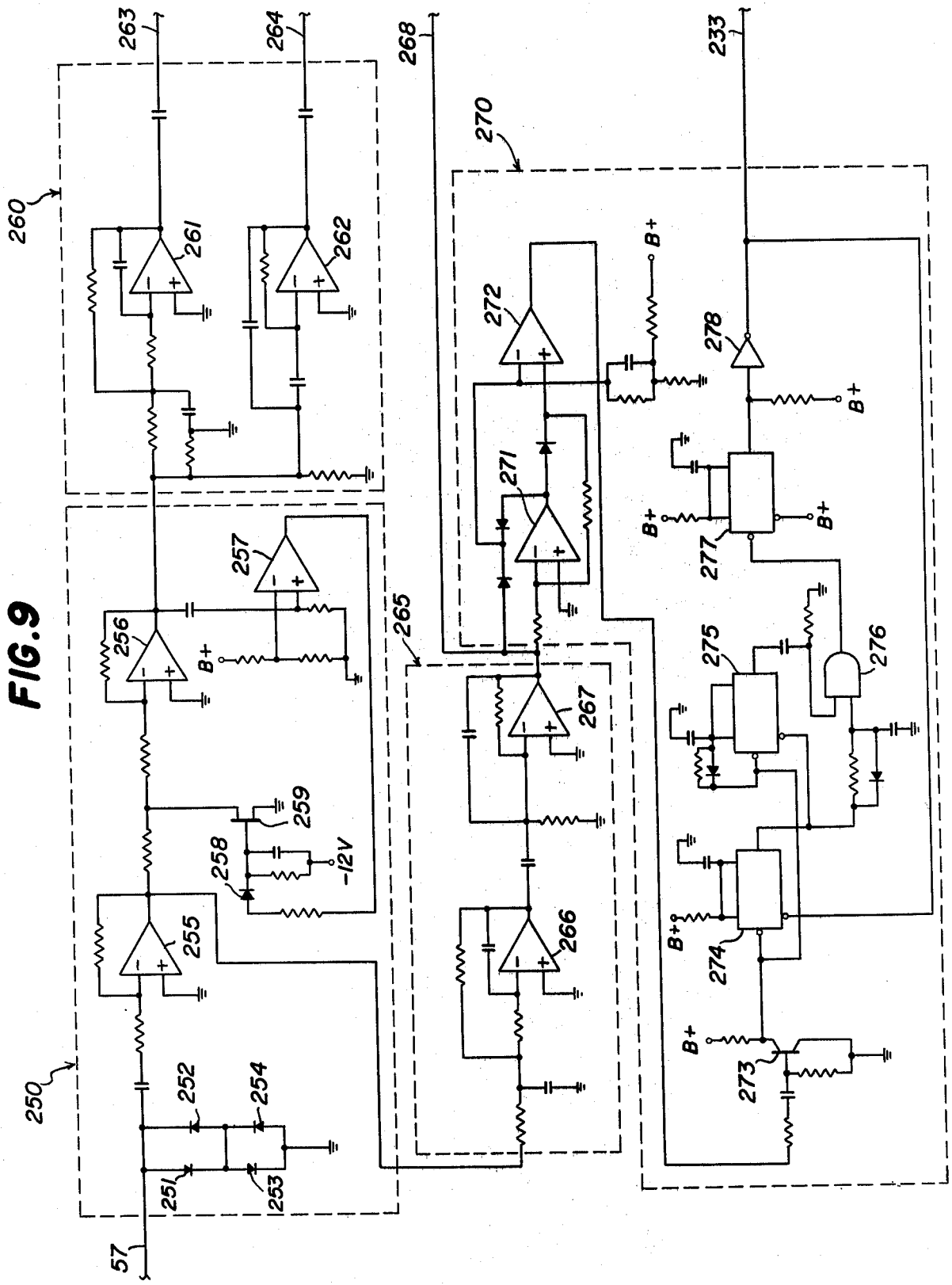
FIG. 9 is a diagram, partially schematic and partially in block, of the limiting, tone detection, active filter and dial pulse detector circuits of FIG. 1.

Referring now to FIG. 9 of the drawings, the limiting circuit 250 includes diodes 251 and 253 connected in series between the conductor 57 and ground and being respectively shunted by oppositely directed diodes 252 and 254, the diodes 251-254 serving to limit the audio signals appearing on the conductor 57. The conductor 57 is connected to the input of a unity-gain operational amplifier circuit 255, the output of which is connected to the input of an operational amplifier circuit 256. The output of the operational amplifier circuit 256 is coupled to the input of an operational amplifier circuit 257, the output of which is coupled via a diode 258 and a unijunction transistor 259 and associated circuitry to the input of the operational amplifier circuit 256, the operational amplifier circuits 256 and 257 and peripheral components constituting an automatic limiting circuit.

The output of the operational amplifier circuit 256 is coupled to the tone detector circuit 260 and, more particularly, to the inputs to two parallel operational amplifier circuits 261 and 262 which are respectively configured with band-pass filtering characteristics so as to respectively pass the high and low frequency components of standard dial tone and tone dialing signals. The outputs of the operational amplifier circuits 261 and 262 are respectively capacitively coupled to the conductors 263 and 264.

The output of the operational amplifier circuit 255 is also coupled to the input of an operational amplifier circuit 266, the output of which is in turn coupled to the input of an operational amplifier circuit 267, the output of which is connected to the conductor 268. The series-connected operational amplifier circuits 266 and 267 are configured to form active filters, attenuating all but the desired frequencies where most of the energy of the rotary dial pulse "clicks" is located, these filters comprising the active filter circuit 265.

The output of the operational amplifier circuit 267 is also coupled to the dial pulse detector circuit 270 and, more particularly, to the input of an operational amplifier circuit 271, the output of which is coupled to the input of an operational amplifier circuit 272. The output of the operational amplifier circuit 272 is coupled to the base of a transistor 273, the emitter of which is grounded and the collector of which is connected through a resistor to B+ and is also connected to the trigger inputs of two 2556 timers 274 and 275. The outputs of the timers 274 and 275 are respectively coupled to the inputs of an AND gate 276, the output of which is connected to the trigger input of a 2556 timer 277, the output of which is connected to the input of an inverter 278, the output of which is connected to the conductor 233. The output of the inverter 278 is also connected to the reset terminal of the timer 274, the output of which is additionally coupled to the reset terminal of the timer 275. Each of the operational amplifier circuits 255, 256, 257, 261, 262, 266, 267, 271 and 272 may be of the type manufactured by Motorola Semiconductor Products, Inc., No. 1458, which type of operational amplifier may hereinafter be referred to as a "1458 operational amplifier".

Referring now to FIG. 10 of the drawings, the tone decode circuit 300 includes seven tone detectors, each generally designated by the numeral 301, and respectively tuned to detect the seven discrete frequencies utilized in standard tone dialing. Since the tone detectors 301 are all identically constructed, except for the values of specific components, only the tone detector 301 for tone "1" will be described in detail.

The conductor 263 is connected to the input of an integrated circuit tone decoder 302, which is a stable phase-locked loop tone decoder, and which may be of the type manufactured by Signetics Corporation, No. NE567. The tone decoder 302 is tuned to the proper frequency by an external RC network including resistors 304 and 307, capacitors 305 and a trimmer 306. The resistor 307 is also tied to the like resistors of each of the other tone detectors 301 and is connected through a capacitor 308 to ground. The output of the tone decoder 302 is connected through a pull up resistor 303 to B+.

The conductor 263 is connected to the inputs of the tone detectors 301 for each of the four low-frequency tone components of the tone dialing signals, while the conductor 264 is connected to the inputs of each of the tone detectors 301 corresponding to the three high frequency components of the tone dialing signals. The seven frequency components to which the tone detectors 301 are respectively tuned are 697 Hz, 770 Hz, 852 Hz, 941 Hz, 1209 Hz, 1336 Hz, and 1477 Hz.

The outputs of the tone detectors 301 are respectively connected to the proper row and column inputs of an integrated circuit 2-of-8 keypad-to-binary encoder 310, which may be of the type manufactured by Motorola Semiconductor Products, Inc., No. 14419, and which type of encoder may hereinafter be referred to as a "14419 encoder". The encoder 310 determines that one column frequency and one row frequency input are present, and that only one of each is present and, based upon the matrix configuration of the standard tone dialing keypad, the encoder 310 determines which digit is being keyed in by the caller. For example, if inputs are present at column 2 and row 1, the encoder 310 would determine that the digit "2" is being keyed in. The encoder 310 then outputs the digit in four-bit BCD on its four data outputs, which are respectively connected to four buffer sections of an integrated circuit buffer circuit 311, which is an MOS-to-TTL buffer, and which may be of the type manufactured by National Semiconductor Corp., No. 4050. This type of buffer may hereinafter be referred to as a 4050 buffer". The outputs of these four buffer sections are respectively connected to conductors TTA, TTB, TTC and TTD. The clock input of the encoder 310 is connected to the output of an integrated circuit clock oscillator circuit 312, which may be of the type manufactured by Signetics Corporation, No. NE555. The encoder 310 has a strobe output 313 which is coupled through another section of the buffer 311 to the conductor 242 and to the input of an inverter 314, the output of which is connected to the conductor 218.

The output of the clock oscillator 312 is also connected to the clock input of another 14419 encoder 315. The row and column inputs of the encoder 315 are respectively connected to the outputs of the tone detectors 301 in essentially the same manner as described above with respect to the encoder 310, the difference being that the row inputs 1 and 4 are switched in the encoder 315, for a reason which will be explained more fully below. The BCD outputs of the encoder 315 are respectively coupled through sections of another 4050 buffer 316 and thence to the inputs of a BCD-to-decimal decoder 320. The strobe output 317 of the encoder 315 is coupled through another section of the buffer 316 to the input of an inverter 318.

The BCD-to-decimal decoder 320 is an integrated circuit which may be of the type manufactured by Signetics Corporation, No. N7442. One selected output of the decoder 320 is connected to one input of a NOR gate 321, having its other input connected to the output of the inverter 318 and its output connected to a conductor 322. A second selected output of the decoder 320 is connected to one input of a NOR gate 323, having its other input connected to the output of the inverter 318 and its output connected to a conductor 324. A third selected output of the decoder 320 is connected to one input of a NOR gate 325, the other input of which is connected to the output of a NOR gate 326, the output of the NOR gate 325 being connected to a conductor 327 and also to one of the inputs of the NOR gate 326. The other input of the NOR gate 326 is connected to the input of the inverter 318.

Also illustrated in FIG. 10 is the dial tone decode circuit 330, which includes two tone detectors 331 which are essentially identical in construction to the tone detectors 301 of the tone decode circuit 300, with the exception that the tone detectors 331 do not include the resistor 307 and capacitor 308. The tone detectors 331 are respectively tuned to pass the two low-frequency components of a standard telephone dial tone, the inputs of the tone detectors 331 being connected to the conductor 263, and the outputs thereof being connected to the inputs of a NOR gate 332, the output of which is connected to the conductor 333. Preferably, the tone detectors 331 are respectively tuned to 350 Hz and 450 Hz.

Referring now to FIG. 11 of the drawings, the amplifier lock-down circuit 340 includes a three-input AND gate 335, the inputs of which are connected respectively to conductors 194, 195 and 336, the output of the AND gate 335 being connected to the set terminal of a 7474 flip-flop 337. The Q output of the flip-flop 337 is connected to one input of a NAND gate 338, the other input of which is connected either to the conductor 333 or to a conductor 334, depending upon the condition of an optional switch 334a. The output of the NAND gate 338 is connected to the input of an inverter 339, the output of which is connected to one of the LED inputs of each of two opto-isolators 341 and 354, which inputs are also connected through a resistor to B+, the other LED inputs being grounded. The photo-resistor outputs of the opto-isolator 341 are connected through a resistor 343 to the control conductors 63 and 64 for the repeater amplifier 60. The photo-resistor outputs of the opto-isolator 354 are connected through a resistor 355 to the control conductors 71 and 72 for the optional repeater amplifier 70.

The conductor 333 is also connected to one input of a NAND gate 345, the other input of which is connected to the Q output of a 7474 flip-flop 346. The set terminal of the flip-flop 346 is connected to the output of a NOR gate 347, the two inputs of which are respectively connected to the conductors 162 and 349. The conductor 333 is also connected to one input of a NAND gate 348, the other input of which is connected to the $\overline{Q}$ output of the flip-flop 337. The outputs of the NAND gates 345 and 348 are connected through a resistor to B+ and to the input of an inverter 351, the output of which is connected through a resistor to B+ and to one of the LED inputs of an opto-isolator 352, the other LED input of which is grounded. The photo-resistor outputs of the opto-isolator 352 are connected through a resistor 353 to the control conductors 61 and 62 of the repeater amplifier 60. The conductors 61–64, 71 and 72, taken together, comprise the "LOCK" line of FIG. 1.

The conductor 333 is also connected to one of the inputs of an AND gate 356, the other input of which is connected to the conductor 357 and the output of which is connected to the trigger input of a 74123 retriggerable timer 358, the data input of which is grounded and the clear input of which is connected to B+. The Q output of the retriggerable timer 358 is connected to the data inputs of a 74121 timer 359, the trigger input of which is connected to B+, and the $\overline{Q}$ output of which is connected to the clear terminals of the flip-flops 337 and 346.

Figure 12:
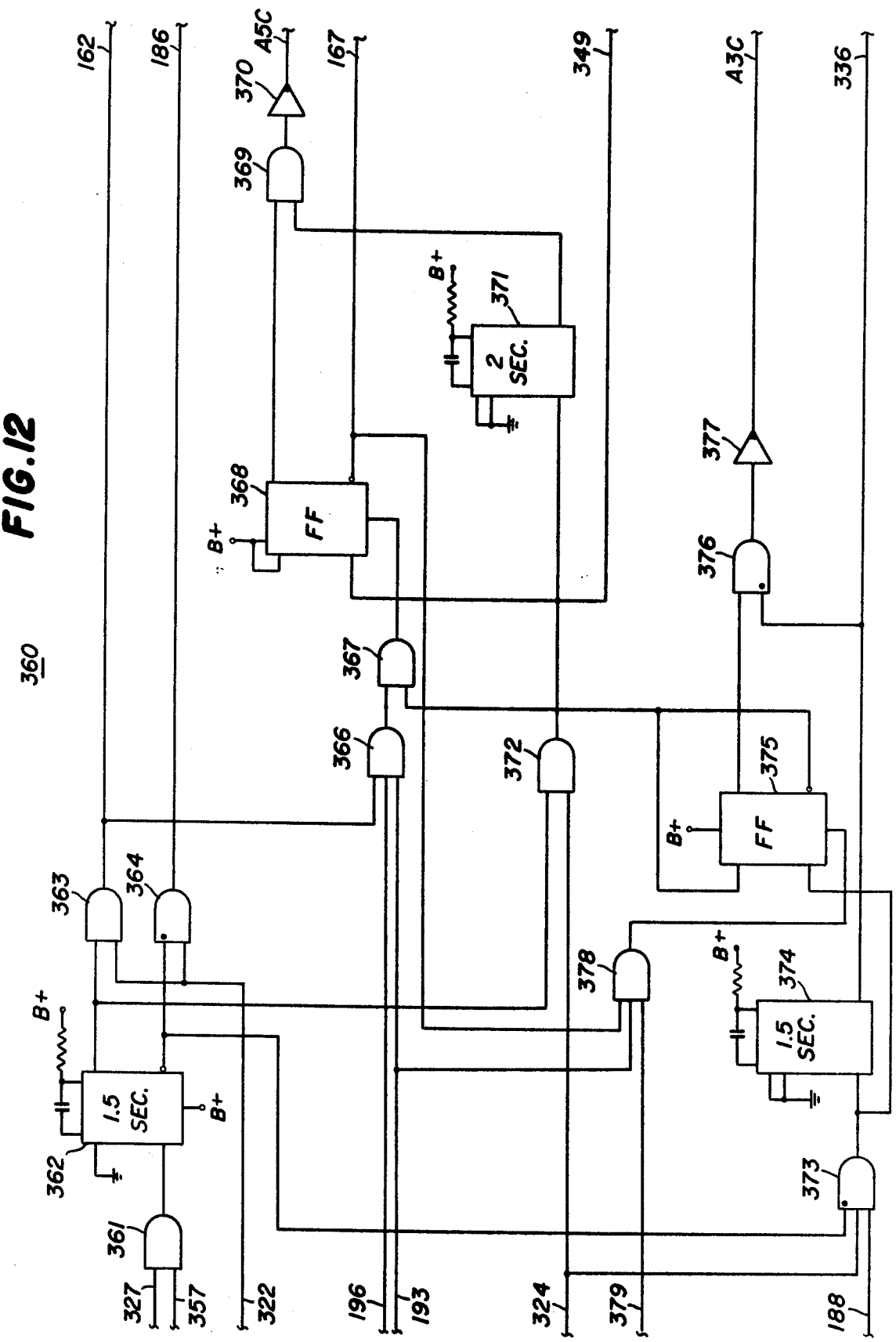
FIG. 12 is a diagram, partially schematic and partially in block, of the section 360 of the relay control and logic circuit of FIG. 1.

Referring now to FIG. 12 of the drawings, the section 360 of the relay control and logic circuit includes an AND gate 361, the inputs of which are respectively connected to the conductors 327 and 357, and the output of which is connected to the trigger input of a 74123 retriggerable timer 362 which has its data input grounded and its clear input connected to B+. The $\overline{Q}$ output of the timer 362 is connected to one input of an AND gate 363, the other input of which is connected to the conductor 322 and the output of which is connected to the conductor 162. The Q output of the timer 362 is connected to one input of an AND gate 364, the other input of which is connected to the conductor 322 and the output of which is connected to the conductor 186.

The output of the AND gate 363 is also connected to one of the three inputs of an AND gate 366, the other two inputs of which are respectively connected to the conductors 193 and 196 and the output of which is connected to one input of an AND gate 367, the output of which is connected to the clear terminal of a 7474 flip-flop 368. The Q output of the flip-flop 368 is connected to one input of an AND gate 369, the output of which is connected through a buffer amplifier 370 to the conductor A5C. The other input of the AND gate 369 is connected to the $\overline{Q}$ output of a 74121 timer 371, the trigger input of which is connected to the output of an AND gate 372, the data of the timer 371 being grounded. The output of the AND gate 372 is also connected to the clock input of the flip-flop 368 and to the conductor 349, the inputs of the AND gate 372 being respectively connected to the Q output of the timer 362 and to the conductor 324.

A three-input AND gate 373 has the inputs thereof respectively connected to the conductors 188 and 324 and the $\overline{Q}$ output of the timer 362, the output of the AND gate 373 being connected to the trigger input of a 74121 timer 374, which has its data inputs grounded. The output of the AND gate 373 is also connected to the clock input of a 7474 flip-flop 375, the $\overline{Q}$ output of which is tied to its data input and is also connected to the other input of the AND gate 367. The Q output of the flip-flop 375 is connected to one input of an AND gate 376, the other input of which is connected to the $\overline{Q}$ output of the timer 374, which is also connected to the conductor 336. The output of the AND gate 376 is connected through a buffer amplifier 377 to the conductor A3C. The clear terminal of the flip-flop 375 is connected to the output of a three-input AND gate 378, the inputs of which are respectively connected to the conductors 193 and 379 and the $\overline{Q}$ output of the flip-flop 368.

Figure 13:
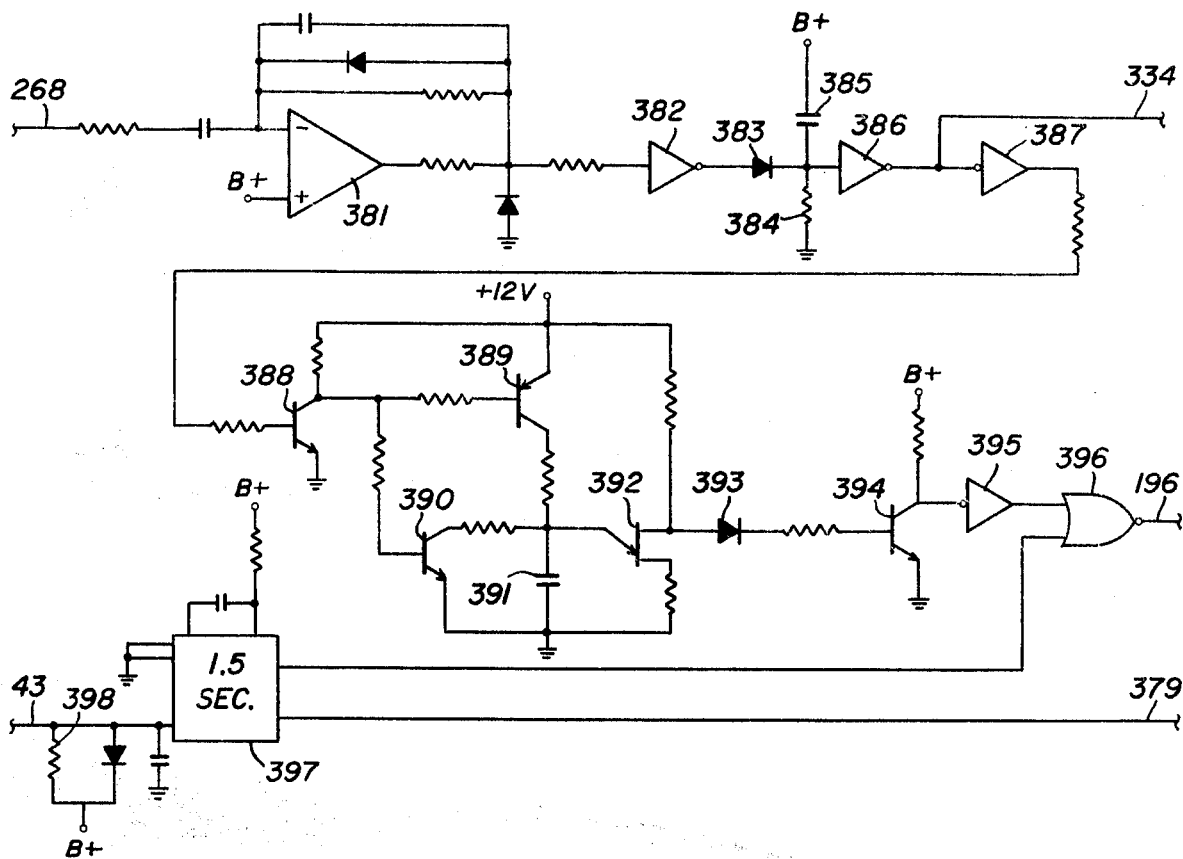
FIG. 13 is a diagram, partially schematic and partially in block, of the disconnect circuit of FIG. 1.

The disconnected circuit 380 is illustrated in FIG. 13 of the drawings. The conductor 268 is coupled to the input of a 1458 operational amplifier circuit 381, the output of which is coupled through an inverter 382 to the anode of a diode 383, the cathode of which is connected to the input of an inverter 386. The cathode of the diode 383 is also connected through a capacitor 385 to B+ and through a resistor 384 to ground. The output of the inverter 386 is connected to the conductor 334 and to the input of an inverter 387, the output of which is connected through resistors to the base of a transistor 388, the emitter of which is grounded and the collector of which is connected through resistors respectively to +12VDC supply and to the bases of transistors 389 and 390, the emitters of which are respectively coupled to +12VDC and to ground. The collectors of the transistors 389 and 390 are respectively coupled through resistors to the upper terminal of a capacitor 391, the lower terminal of which is grounded. The upper terminal of the capacitor 391 is also connected to the control electrode of a unijunction transistor 392 which is connected by resistors between +12VDC supply and ground. The output of the unijunction transistor 392 is connected through a diode 393 and a resistor to the base of a transistor 394, the emitter of which is grounded and the collector of which is connected through a resistor to B+. The collector of the transistor 394 is also connected through an inverter 395 to one input of a NOR gate 396, the output of which is connected to the conductor 196 and the other input of which is connected to the Q output of a 74121 timer 397, which has its data inputs grounded. The $\overline{Q}$ output of the timer 397 is connected to the conductor 379, and the trigger input thereof is connected to the conductor 43 and also through a resistor 398 shunted by a diode to B+, and through a capacitor to ground.

Figure 14:
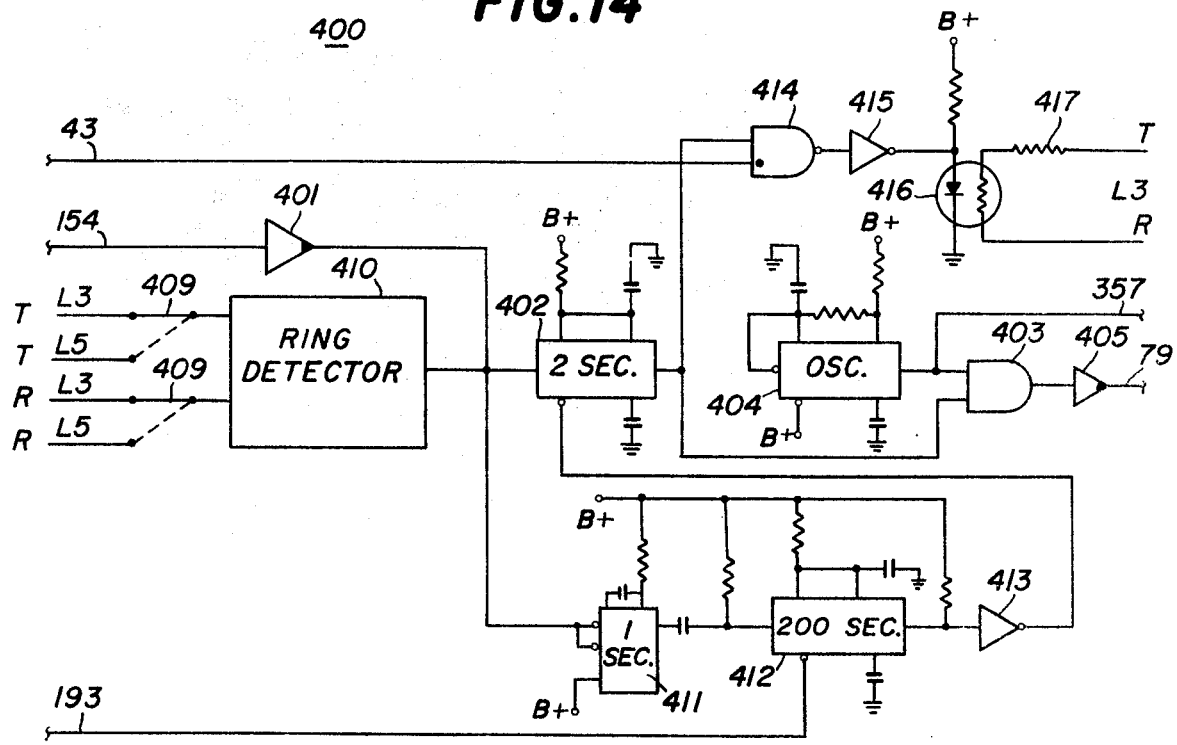
FIG. 14 is a diagram, partially schematic and partially in block, of the "BEEP" circuit of FIG. 1.

The "BEEP" circuit 400 is illustrated in FIG. 14. The conductor 154 is connected through a buffer amplifier 401 to the trigger input of a 2556 timer 402, which is configured to have a time constant of about 2,000 ms. The output of the timer 402 is connected to one input of an AND gate 403, the other input of which is connected to the output of a 2556 timer 404 which is configured as an oscillator, the oscillator output also being connected to the conductor 357. The output of the AND gate 403 is connected through a buffer amplifier 405 to the conductor 79.

The "BEEP" circuit 400 also includes a ring detector 410 which is identical in construction to the ring detector 100 described above in connection with FIG. 6. The input terminals of the ring detector 410 are respectively connected to the Tip and Ring conductors of the line L3 or, alternatively, to the Tip and Ring conductors of an additional line L5, depending upon the condition of an optional dpdt switch 409. The output of the ring detector 410 is connected to the trigger input of the timer 402, and also to the data inputs of a 74121 timer 411, which has its trigger input connected to B+ and has a time period of about 1,000 ms. The Q output of the timer 411 is coupled to the trigger input of a 2556 timer 412 which has a time period of about 200 seconds and has its output connected through a resistor to B+ and also through an inverter 413 to the reset terminal of the timer 402. The reset terminal of the timer 412 is connected to the conductor 193.

The output of the timer 402 is also connected to one input of a NAND gate 414, the other input of which is connected to the conductor 43 and the output of which is connected to the input of an inverter 415. The output of the inverter 415 is connected through a resistor to B+ and to one LED input terminal of an opto-isolator 416, the other input terminal of which is grounded. The photo-resistor output terminals of the opto-isolator 416 are connected through a resistor 417 to the Tip and Ring conductors of the line L3.

Figure 15:
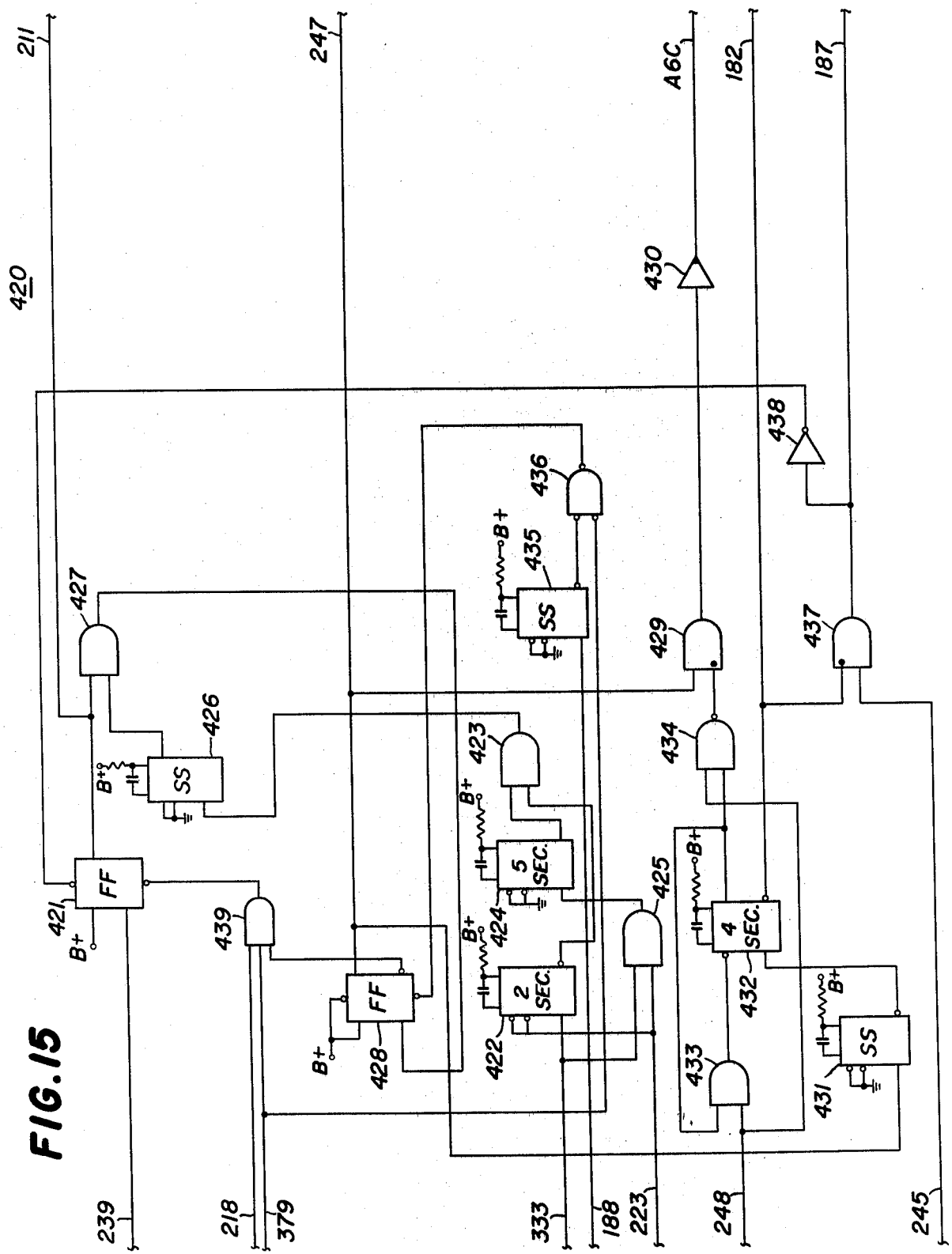
FIG. 15 is a diagram, partially schematic and partially in block, of the dial mode control circuit of FIG. 1.

The dial mode control circuit 420 is illustrated in FIG. 15, and includes a 7474 flip-flop 421, the clock input of which is connected to the conductor 239 and the Q output of which is connected to the conductor 211. The conductor 333 is connected to the trigger input of a 74121 timer 422, the data inputs of which are connected to the conductor 223 and the $\bar{Q}$ output of which is connected to one input of an AND gate 423. The other input of the AND gate 423 is connected to the $\bar{Q}$ output of a 74121 timer 424, the trigger input of which is connected to the output of an AND gate 425 which has its inputs respectively connected to the conductors 333 and 223. The output of the AND gate 423 is connected to the trigger input of a 74121 single-shot timer 426, the Q output of which is connected to one input of an AND gate 427, the other input of which is connected to the Q output of the flip-flop 421. The output of the AND gate 427 is connected to the clock input of a 7474 flip-flop 428, the Q output of which is connected to the conductor 247 and to one input of an AND gate 429, the output of which is connected through a buffer amplifier 430 to the conductor A6C. The Q output of the flip-flop 428 is also connected to the trigger input of a 74121 timer 431, the $\bar{Q}$ output of which is connected to the trigger input of a 74123 retriggerable timer 432. The data input of the timer 432 is connected to the output of an AND gate 433, which has one input connected to the conductor 248 and the other input connected to the Q output of the timer 432, which output is also connected to one input of a NAND gate 434. The other input of the NAND gate 434 is connected to the conductor 248, and its output is connected to the other input of the AND gate 429.

The conductor 188 is connected to the trigger input of a 74121 timer 435, the $\bar{Q}$ output of which is connected to one input of an AND gate 436. The other input of the AND gate 436 is connected to the conductor 379, and its output is connected to the clear terminal of the flip-flop 428. The $\bar{Q}$ output of the timer 432 is connected to the conductor 182 and to one input of an AND gate 437, the other input of which is connected to the conductor 245, and the output of which is connected to the conductor 187 and through the inverter 438 to the set terminal of the flip-flop 421.

The $\bar{Q}$ output of the flip-flop 428 is connected to one of the three inputs of an AND gate 439, the other inputs of which are respectively connected to the conductors 218 and 379 and the output of which is connected to the clear terminal of the flip-flop 421.

DETAILED DESCRIPTION OF OPERATION

Powering Up--System Reset

The various DC supply voltages utilized in the automatic interconnection system 30 are supplied by a suitable power supply (not shown). The ON-OFF switch 41 (FIG. 4) controls the ability of the system 30 to answer incoming calls and process them, but it does not actually turn off power to the system 30. When the switch 41 is in the OFF position, the conductor 43 is tied to ground and the LED 47 is not illuminated. The conductor 42 and, therefore, the coils of the relays A1-A6 (FIG. 3) are open-circuited. Additionally, the conductor 43 is connected to the timer 397 (FIG. 13) which is the system reset timer and, with the conductor 43 grounded, the timer 397 is prevented from triggering. The purpose of the timer 397 is to insure that when the system 30 is initially powered up, all gates will come in the proper position. This is done by providing a momentary reset pulse on the conductor 379 each time the system 30 is powered up, and each time the switch 41 is turned to the ON position.

When it is desired to activate the system 30, the switch 41 is turned to the ON position, connecting the conductor 42 to ground for supplying ground to the relay drivers 81. The conductor 43, which is supplied B+ voltage through the resistor 398 (FIG. 13), is no longer shorted to ground, so the output of the inverter 44 goes high, causing the output of the buffer amplifier 45 to go high and allowing the LED 47 to be illuminated via the resistor 46.

When the ground is removed from the trigger input of the timer 397 (FIG. 13), it is triggered through the resistor 398, causing its Q output to go high and its $\bar{Q}$ output to go low for about 1,500 ms. The high Q output of the timer 397 is fed to the NOR gate 396, causing its output to go low on the conductor 196, thereby clearing the flip-flops 170 and 180 (FIG. 7). The low signal on conductor 196 is also fed to the AND gate 366 (FIG. 12), causing its output to go low, which in turn causes the output of the AND gate 367 to go low to clear the flip-flop 368.

The low $\bar{Q}$ output signal of the timer 397 is fed via the conductor 379 through the AND gate 378 (FIG. 12) to clear the flip-flop 375, and through the AND gate 439 (FIG. 15) to clear the flip-flop 421.

Loading a Security Code

The three thumbwheel switches 201 (FIG. 8) are set to the three-digit security code desired. Each thumbwheel switch 201 feeds its four bits into the four data inputs of a latch 202, 203 or 204, the clock inputs of which latches are all tied together and fed through a keyswitch 205 to ground. The switch 205 is normally closed and with their inputs thus grounded, the latches 202-204 will not accept any input at their data inputs. When the switch 205 is open, the clock inputs of the latches 202—204 go high and the latches 202-204 transfer whatever voltage level is present at each data input to the corresponding output. Thus, if the data input is high, the output goes high. With their clock inputs high, the outputs of the latches 202-204 will change as their data inputs change during the setting of the thumbwheel switches 201. When the switch 205 is reclosed, the latches 202-204 will maintain their outputs at the data levels of the corresponding inputs at the time the switch 205 was reclosed and the clock inputs regrounded. If the voltage levels presented to the data inputs of the latches 202-204 are now changed, the outputs do not follow, so the thumbwheel settings may be changed to prevent unauthorized persons from reading the code from the thumbwheels. Thus, the latches 202-204 act as memories, only accepting input from the thumbwheel switches 201 when the keyswitch 205 is open. Preferably, keys to the switch 205 would be available only to authorized personnel.

The outputs of the latches 202-204 are respectively fed to the A inputs of the comparators 207-209, the B inputs of which are connected to the outputs of the data selector 210. Depending upon which condition the data selector 210 is in, as determined by the signal on the conductor 211, it feeds to its outputs either the data from the tone decode circuit 300 or the data from the pulse decode circuit 230. Each of the comparators 207-209 compares the data received at its B input from the data selector 210 with the data received at its A inputs from the thumbwheel switches 201 and, if they are the same, this indicates that the proper digit of the security code has been activated and the comparator A=B output goes high.

It is possible to disable the security code feature by entering "0" into each of the three thumbwheel switches 201. When this is done, no security code is required to access the system 30. With the security code feature thus bypassed, a caller is immediately connected to the outgoing line L2 as soon as his incoming call is answered by the system 30. In its idle state, the data selector 210 outputs "0000", indicating that no digit is being fed to its input. Thus, if the A inputs of each of the comparators 207-209 are also being fed the BCD input "0000", indicating that all the thumbwheel switches 201 are set at 0, the A= B outputs of the comparators 207-209 will be maintained high.

Ring Detection

The neon lamp 104 of the opto-isolator 105 (FIG. 6) is connected through a voltage divider formed by the resistors 101 and 102 to the Tip and Ring conductors of the incoming telephone line L1, and illuminates in the presence of a ringing signal on line L1, which signal is typically 90volts at 20-30 Hz. The lamp 104 is optically coupled to the photo-resistor 106 of the opto-isolator 105, and causes its normally very high resistance to decrease. Thus, in the presence of a ringing signal, the output of the photo-resistor 106 goes high as a result of the normally high signal fed to it from the conductor 99 through the charge resistor 107. The rise time of this high output signal is slowed by the combination of the capacitor 108 and resistor 109, and when it reaches the trigger level of the Schmitt trigger 110, the output of the Schmitt trigger 110 goes high, and is fed to a differentiator formed by the capacitor 112 and the resistors 113 and 114.

The output of the differentiator is normally high by reason of the B+ supply voltage connected to the resistor 113. When the output of the Schmitt trigger 110 goes high in the presence of a ringing signal, the output of the differentiator remains high. But when the ringing signal ceases (between rings), the output of the Scmitt trigger 110 returns to its normal low state. This change in level of the output of the Schmitt trigger 110 from high to low causes a low-going spike at the output of the differentiator which serves as an indication that a ring has been detected on line L1, and triggers the timer 121 of the answer timer circuit 120. The ring detector 130 operates in exactly the same manner to detect ringing signals on line L4.

Idle Line Detection

If the outward line L2 is in use at the time an inward call is detected by the system 30, the incoming call will not be answered. When line L2 is in the idle condition, there is a DC voltage of approximately 48 volts between the Tip and Ring conductors, which is fed through the rectifier bridge 91 (FIG. 5) to the LED input terminals of the opto-isolator 95, illuminating the LED and causing the photo Darlington transistor coupled pair of the opto-isolator 95 to conduct to ground, thereby holding the output lead thereof low. This low level is fed to the base of the transistor 98, causing it to conduct and produce a high level signal on the conductor 99. When line L2 is in use, the DC voltage level thereon drops to approximately 10 volts, which will not illuminate the LED of the opto-isolator 95, causing its output lead to go high and switching off the transistor 98. This removes the high level from the conductor 99, and since the high is no longer applied to the photo-resistor 106 in the ring detector 100 (or 130), that circuit will not respond to ringing signals on the incoming telephone line L1 (or L4).

Answering Incoming Call on Line L1

When a caller desires to access the system 30, he calls the telephone number of line L1. The ringing signals are detected by the ring detector 100, which in turn triggers the timer 121, causing its output to go high for the time period determined by the resistor 122 and capacitor 123, preferably approximately 15 seconds. The signals on the conductors 126 and 127 are normally high. If the line L4 is in use, the signal on the conductor 126 goes low, and if the line L2 is in use, the signal on the conductor 127 goes low. The low level on either conductor causes the output of the AND gate 125 to go low, resetting the timer 121, and preventing its output from going high, even in the presence of an input trigger signal.

If lines L2 and L4 are both idle, the high output of the timer 121 when it is triggered is fed via the conductor 157 through the OR gate 161 (FIG. 7) to clock the flip-flop 163 and cause the B+ signal at its data input to be transferred to its Q output, this high signal being fed to the input of the AND gate 165. The output of the timer 121 is also fed through the inverter 151 (FIG. 6) to the input of the AND gate 153, causing its output to go low on the conductor 154, and thereby causing the output of the AND gate 168 (FIG. 7) to go high to one input of the AND gate 166, the other input of which, via conductor 167, is the normally high Q̄ output of the flip-flip 368 (FIG. 12). Therefore, the output of the AND gate 166 goes high to the other input of the AND gate 165, and since both of its inputs are now high, its output goes high through the buffer amplifier 175 to the conductor A1C.

The high signal on the conductor A1C is fed to the relay driver 81 (FIG. 3) controlling relay A1, and causes the transistor 85 to conduct, thereby presenting a ground to the coil of the relay A1 which is energized to close the contacts thereof. Thus, the Tip and Ring conductors of line L1 are connected through the relay contacts A1a and A1b to the winding 51 of the five-winding transformer 55 in the coupling and amplifier circuit 50 (FIG. 2). This transformer has a DC resistance of less than 300 ohms, and this load across the Tip and Ring conductors of line L1 presents an "off hook" condition to the central office, in effect "answering" the incoming call. Relay contacts A1c close a dry path between the auxiliary leads A and $A_1$ of line L1, and contacts A1d close a dry path between the auxiliary leads of line L2 for lighting buttons in key telephones, as was described above.

The low signal level on conductor 154 is also fed through the buffer amplifier 401 of the "BEEP" circuit 400 (FIG. 14) to trigger the timer 402, causing its output to go high for its time period, perferably about 2,000 ms. This high output is fed to the input of the AND gate 403, the other output of which is normally high from the oscillator 404. Thus, the output of the AND gate 403 goes high through the buffer amplifier 405 and is fed via the conductor 79 to the base of the transistor 75 (FIG. 2), switching it on and causing the resonant circuit of the capacitor 74 and transformer winding 52 to induce an audible signal onto the telephone line L1 through the transformer 55 to indicate to the caller that he has reached the system 30.

The relay A1 will continue to be energized for at least the 15-second time period of the timer 121. If nothing is done by the calling party to enter a security code, and if the code "000" has not been entered into the security code circuit 200, the output of the timer 121 will return to its normal low state when it times out after fifteen seconds. Thus, the output of the AND gate 153 will go high, causing the output of the NAND gate 168 (FIG. 7) to go low, which in turn causes the outputs of the AND gates 166 and 165 to go low, removing the high signal on the conductor A1C and de-energizing the relay A1 for disconnecting the line L1 from the transformer 55 (FIG. 2). The system 30 is now ready to accept another call.

Answering Incoming Call on Line L4

A user desiring to access the system 30 may also call the telephone number of the line L4, which will usually be an inward WATS line or FX line, but in most ways acts similarly to the line L1. Ringing signals on the line L4 are detected by the ring detector 130, which triggers the answer timer 140, unless either the line L1 or L2 is in use, in which case the answer timer 140 will be inhibited by signals on the conductors 141 or 127. The signal on the conductor 141, the inverted output of the AND gate 165 (FIG. 7), is low during the time that the relay A1 is energized and the line L1 is engaged.

When triggered, the output of the answer timer 140 goes high, causing the output of the inverter 152 to go low, which signal is fed via the conductor 158 to the clear terminal of flip-flop 163 (FIG. 7), causing its Q output to go low to prevent energization of the relay A1, and causing its $\bar{Q}$ output to go high to an input of the AND gate 177. The low output of the inverter 152 (FIG. 6) is also fed into the AND gate 153, causing its output to go low via the conductor 154 to the NAND gate 168 (FIG. 7), thereby causing its output and the output of the AND gate 166 to go high in the same manner as was described above with respect to an incoming call on line L1. The high output of the AND gate 166 is fed to the other input of the AND gate 177, whose output goes high through the buffer amplifier 178 and is fed via the conductor A4C to the relay driver 81 of the relay A4 (FIG. 3) for energizing the relay A4 and closing its contacts. Thus, the line L4 is connected to the winding 51 of the transformer 55 through the relay contacts A4a and A4b, thereby "answering" the incoming call, and the contacts A4c and A4d close dry paths between the auxiliary leads of the lines L4 and L2. It will be noted that the high output of the AND gate 177 (FIG. 7) also causes the output of the inverter 179 to go low, this signal being fed via the conductor 126 to the AND gate 125 (FIG. 6) for inhibiting the answer timer 120.

The relay A4 will remain energized for the 15-second time period of the answer timer 140 and if, during that period, nothing is done by the calling party to enter a security code, and if the code "000" has not been entered into the security code circuit 200, the answer timer 140 will time out and its output will go low, thereby causing the output of the AND gate 166 (FIG. 7) to go low in the same manner as was described above in connection with an incoming call on line L1. This will cause the output of the AND gate 177 to go low, thereby removing the high signal from the conductor A4C and de-energizing the relay A4 for disconnecting the line L4 from the transformer 55.

When the ringing signal on the line L4 is detected, the low output signal on the conductor 154 will actuate the "BEEP" circuit 400 (FIG. 14) to cause an audible signal to be impressed on the line L4, in the same manner as was described above with respect to line L1.

Presenting Security Code--Tone Dialing

The following description will be in connection with an incoming call over line L1, but it will be understood that the same procedure would be followed for an incoming call on line L4. For purposes of this description, it is assumed that the caller is calling from a tone dialing type telephone.

Any audio signal fed to the transformer 55 (FIG. 2) are coupled by the transformer winding 56 and the conductor 57 to the limiting circuit 250 (FIG. 9). The diodes 251–254 to ground limit the audio signal, which proceeds through the unity gain operational amplifier circuit 255 to the input of the operational amplifier circuit 256 which, in conjunction with the operational amplifier circuit 257, the unijunction transistor 259 and associated components make up an automatic limiting circuit. Thus, as the level of the audio signals increases, depending upon the transmission parameters of the telephone call being made to the system 30, the output of the operational amplifier circuit 256 remains constant. This output is fed into the parallel operational amplifier stages 261 and 262 of the tone detector circuit 260, each of which stages has its own gain and filtering characteristics, such that the operational amplifier stage 261 passes the four low frequencies of a tone dialer, while the operational amplifier stage 262 passes the three high frequencies of a tone dialer.

The outputs of the operational amplifier stages 261 and 262 are respectively coupled via the conductors 263 and 264 to the tone decode circuit 300 (FIG. 10). More particularly, the conductor 263 is connected to the inputs of the four tone detectors 301, respectively associated with the four row frequencies, while the conductor 264 is connected to the inputs of the three tone detectors 301 respectively associated with the three column frequencies of a tone dialing pad matrix. Each dialing tone comprises one high frequency and one low frequency component and will, therefore, produce outputs on each of the conductors 263 and 264 which will cause the corresponding two of the tone detectors 301 to transmit an output signal to the 2-of-8 keypad-to-binary encoder 310, which will determine which digit is represented by that particular combination of two frequency components, and will feed that digit in four-bit BCD form from its outputs through the buffer 311 and via the conductors TTA-TTD to the tone-dial input terminals of the data selector 210 (FIG. 8).

Besides combining the three column inputs and four row inputs to form BCD codes denoting the digit being keyed in, the encoder 310 also has a circuit which will eliminate erroneous data at its output due to contact bounce, and the response of the decoders 302 to transient voice signals. Thus, pulses from the clock oscillator 312 are fed at the rate of about 1,000 pulses per second to the clock input of the encoder 310. When the encoder 310 detects row and column input and provides data on its outputs, an internal counter therein begins counting the clock pulses. When the row and column inputs are stable for 80 clock pulses, a strobe pulse occurs at the strobe output 313 of the encoder 310, and is fed through the buffer 311 to indicate to various circuitry in the system 30 that a tone dialing system has been correctly received, as will be described more fully hereinafter.

So, an incoming caller will first hear the ringback signals on line L1 cease when the system 30 has answered his call, and will then hear the two-second audible "BEEP" tone confirming that the system 30 has been accessed. He then begins to enter the three-digit security code programmed into the system 30 which, for purposes of illustration, we will assume is the code "123". The caller first presses the "1" button on his tone dialing pad, and this tone will be coupled via the conductor 57 to the tone detector circuit 260 (FIG. 9), which will separate the two frequency components of the tone and feed them to the tone decode circuit 300 (FIG. 10), wherein the encoder 310 will transmit a BCD representation of the digit "1" to the data selector 210 (FIG. 8). The select signal on conductor 211 is normally low, in which condition the data selector 210 will respond to its tone data inputs on the conductors TTA-TTD. As the caller presses the "1" button on his tone dialing pad, after about 80 ms. of stable tone signal, the encoder 310 produces its strobe output pulse which is fed via the conductor 242 to the input of the NOR gate 241 in the rotary/tone control circuit 240 (FIG. 8), the output of which gate goes low and is fed to the strobe input of the data selector 210 for causing the data on the conductors TTA-TTD to be transferred from the inputs to the outputs of the data selector 210, and thence to the B inputs of the comparators 207-209. In comparator 207 the B inputs will match the A inputs from the thumbwheel switch 201, so the A=B output of the comparator 207 will go high, clocking the flip-flop 212 and causing its Q output to go high to the data input of the flip-flop 213.

The caller now presses the "2" button of his tone dialing pad, and after 80 ms., the strobe output of the encoder 310 causes the BCD representation of this digit to be transferred from the inputs to the outputs of the data selector 210 and to the B inputs of the comparators 207-209. The A=B output of the comparator 208 goes high to the clock input of the flip-flop 213 and, in the presence of the high on its data input, causes its Q output to go high to an input of the AND gate 214.

The caller then presses the "3" button of his tone dialing pad and the BCD representation of this digit is transferred to the comparator 209 in the same manner as the preceding digits, and the A=B output of this comparator goes high to the other input of the AND gate 214, causing its output to go high via the conductor 174 to indicate to the section 160 of the relay control and logic circuit (FIG. 7) that the security code has been correctly received.

It will be noted that in order for the high signal at the output of the AND gate 214 to be generated, the user must transmit the three digits of the security code in the proper consecutive order, with no extraneous digits intermixed. In addition, the three digits must be correctly transmitted within a predetermined time period. When the system 30 is idle, the signal on the conductor 154 from the output of the AND gate 153 (FIG. 6) is high, and is fed to the OR gate 215 of the security code circuit 200 (FIG. 8), causing the output of that gate to be high, which in turn causes the output of the OR gate 216 to be high, clearing the counter 217. When the system 30 answers an incoming call, the signal on conductor 154 goes low, removing the highs from the outputs of the OR gates 215 and 216 and, thus, removing the clear from the counter 217. As the caller transmits each digit of the security code, the strobe output of the encoder 310 (FIG. 10) causes the output of the inverter 314 to go low and be fed via the conductor 218 to the clock input of the counter 217. As the caller successfully transmits the first digit of the security code, the high A=B output of the comparator 207 is fed to the input of the OR gate 215, causing its output and the output of the OR gate 216 to again go high, re-clearing the counter 217. However, as the next digits are transmitted by the user, the counter 217 again begins to count, and at the third digit, the counter 217 reaches a count of "2" and its output goes high to the input of the NOR gate 219, causing its output to go low and clear the flip-flops 212 and 213. Thus, if the caller has not transmitted the proper three digits of the security code but has instead transmitted an erroneous 3-digit sequence, the counter will immediately reset the flip-flops 212 and 213, and the sequence must be begun again. If the correct security code is not received within 15 seconds, the timer 121 (FIG. 6) will time out, causing disconnection of the line L1 and requiring the caller to place another call to the system 30.

As soon as the security code has been correctly transmitted, the high output of the AND gate 214 is fed to the input of the OR gate 216, causing its output to go high and clear the counter 217, while a high signal appears on conductor 188 in a manner to be described below, causing the output of the OR gate 220 to go high which, through the NOR gate 219, clears the flip-flops 212 and 213.

When the security code has been properly entered, the high signal on conductor 174 is fed to the input of the NOR gate 172 (FIG. 7), the output of which goes low, setting the flip-flops 170 and 180 and causing the output of the AND gate 184 to go low, triggering the timer 183. The Q output of flip-flop 170 goes high to the NAND gate 169, the other input of which is also high, whereby the output of the NAND gate 169 goes low and is fed to the NAND gate 168 to take the place of the low signal on conductor 154 which disappears when the timer 121 (FIG. 6) times out 15 seconds after the initial ring signal on line L1 is detected. Thus, the output of the NAND gate 168 is maintained high and, through the AND gates 166 and 165 and buffer amplifier 175 maintains the relay A1 energized to keep line L1 connected to the transformer 55.

The Q output of flip-flop 180 is now high and is fed into the AND gate 181, whose input on conductor 182 is the normally high $\overline{Q}$ output of the timer 432 (FIG. 15), but whose input from the $\overline{Q}$ output of the timer 183 has just been triggered low. When the timer 183 times out after about 2,000 ms., its $\overline{Q}$ output returns high, thus causing the output of the AND gate 181 to go high through the buffer amplifier 189 to the conductor A2C, thereby energizing the relay A2 via the relay driver 81 for that relay, closing the relay contacts. Thus, line L2 is connected to the winding 53 of the transformer 55 via the relay contacts A2a and A2b and the repeater amplifier 60, a dry path between the auxiliary leads of line L2 being closed by the contacts A2c. Thus, there is a transmission path established from the Tip and Ring conductors of line L1 through the transformer 55 and the repeater amplifier 60 to the Tip and Ring conductors of the line L2. The high output of the AND gate 181 is also fed via the conductor 188 to the OR gate 220 (FIG. 8) for clearing the flip-flops 212 and 213, and is also inverted by inverter 190 and fed via conductor 127 to the AND gates 125 (FIG. 6) to inhibit the answer timers 120 and 140, as explained above.

When the security code is set at "000", the comparators 207-209 will normally output a high on their A=B outputs, which signals are fed to the AND gate 221, the other input of which on conductor 156 is also high, being the inverted low output of the AND gate 153 (FIG. 6). Therefore, the output of the AND gate 221 goes high and is fed via conductor 173 to the NOR gate (FIG. 7) to serve the same function as the signal on the conductor 174 did when the security code was used, as described above, to actuate the relay A2.

Decoding "*", "#", "0" and Dial Tone

The tone decode circuit 300, in addition to decoding digits 1-9 for the security code (note that the digit "0" is preferably not used in the security code for reasons set forth below), also decodes the digits "0", "*" and "#" which may normally be generated by a standard tone dialing keypad, for use in performing other functions in the system 30. Thus, referring to FIG. 10, the outputs of the tone detectors 301 are also fed to the encoder 315 in essentially the same way that they are fed to the encoder 310, the difference being that the row 1 and row 4 inputs are switched in the encoder 315. This is because the encoder 315 does not produce a strobe pulse for the row 4, column 1 and row 4, column 3 frequencies, which are normally the "*" and "#" functions on the tone dialing pad. Since this strobe output is required for the proper operation of the system 30, the row 1 and 4 inputs have been interchanged, whereby the "*", "0" and "#" functions respectively occupy the "1", "2" and "3" positions in the encoder 315.

The outputs of the encoder 315 are fed through the buffer 316 to the BCD-to-terminal decoder 320, only three of the outputs of which are utilized, viz., those corresponding to "1", "2" and "3" which respectively represent the "0", "*" and "#" funtions. More particularly, the decoder 320 output indicating the presence of the "*" function is a low level which is fed to the NOR gate 321, the other input of which is the inverted strobe pulse from the encoder 315, fed from the inverter 318. Thus, the output of the NOR gate 321 monentarily goes high on the conductor 322. In like manner, the output of the decoder 320 representing the "#" function is a low level which is fed to the input of the NOR gate 323, the other input of which is the inverted strobe output of the encoder 315, which causes the output of the NOR gate 323 momentarily to go high on the conductor 324 when the frequencies making up the "#" function have been stably present for 80 ms.

The "0" function is decoded slightly differently, because it must produce a high level for as long as the "0" button is pressed by the caller, in contrast with the "*" and "#" functions which may be pulses, as caused by the momentary strobe pulse into the NOR gates 321 and 323. Thus, the low output of the decoder 320 denoting the "0" function is fed into the NOR gate 325, the other input of which is the output of the NOR gate 326, one input of which is the high strobe output of the encoder 315 and the other input of which is fed from the output of the NOR gate 325. Thus, the inputs to the NOR gate 326 are normally low and its output normally high. But when the "0" function frequency components have been stably present for 80 ms., the strobe output of the encoder 315 will cause the output of the NOR gate 326 to go momentarily low and in turn cause the output of the NOR gate 325 to go high on the conductor 327. This high is fed back through the NOR gate 326 to maintain its output low for as long as the "0" is present.

The tone detectors 311 of the dial tone decode circuit 330 are respectively tuned to the frequency components of the Bell System Precise Dial Tone. Thus, in the presence of a dial tone, the outputs of the tone detectors 331 go low and are fed to the inputs of the NOR gate 332, causing its output to go high on the conductor 333 to indicate the presence of dial tone to various parts of the system 30.

Amplifier Lock-Down

At this stage of operation, after the security code has been transmitted and line L2 has been connected, the calling party hears the dial tone from line L2 and this is the signal that he can begin dialing his outgoing call. But because the repeater amplifier 60 is in its normal mode of operation, it will amplify only the dial tone from line L2, since this is the louder signal, and it will attenuate any signals coming from line L1, including the tone dialing signals. To correct this situation, the repeater amplifier 60 must be switched or "locked-down" so that it is forced to look not at the loud dial tone coming from line L2, but rather at line L1, from which the tone dialing signals for dialing the outgoing call will be received.

Thus, as the caller finishes entering the security code, and the signal on conductor 174 goes high, the output of the NOR gate 172 (FIG. 7) goes low and is fed via conductor 195 to the AND gate 335 (FIG. 11), the output of which goes low to set the flip-flop 337, causing its Q output to go high to the NAND gate 338. The other input to the NAND gate 338 is the high signal on the conductor 333 from the dial tone decode circuit 330 (FIG. 10) indicating detection of dial tone from the line L2. Thus, with dial tone present after the flip-flop 337 has been set, the output of the NAND gate 338 goes low, causing the output of the inverter 339 to go high, allowing the LED of the opto-isolator 341 to be illuminated by B+ through resistor 342. This causes the photo-resistor of the opto-isolator 341 to conduct, placing the resistance 343 across the control conductors 63 and 64 of the repeater amplifier 60, which causes the amplifier 60 to switch to its locked-down condition wherein it amplifies only the signals arriving on line L1. In this manner, the tone dialing signals generated by the calling party on line L1 are amplified and go out over line L2 to its central office.

After the first tone dialing digit is transmitted, the central office detects it and breaks the dial tone on line L2. Since the dial tone decode circuit 330 no longer detects dial tone, the signal on the conductor 333 goes low, causing the output of the NAND gate 338 (FIG. 11) to go high and, through the inverter 339 removing current from the LED of the opto-isolator 341 and, thereby essentially open-circuiting the control conductors 63 and 64 for switching the amplifier 60 back to its normal mode of operation in which it is free to amplify whichever received signal is louder. Since dial tone from line L2 is no longer present, the loudest signals to the amplifier 60 will be the tone dialing signals generated by the calling party, who continues to dial his call. The call is completed in the usual manner.

The conductor 333 is also connected to the input of the AND gate 356 (FIG. 11), the other input of which is the output of the oscillator 404 of the "BEEP" circuit 400 (FIG. 14), fed via the conductor 357. Thus, in the presence of a dial tone, each time the output of the oscillator 404 goes high (about 1,000 times per second), the output of the AND gate 356 goes high to trigger the retriggerable timer 358, causing its Q output to go high. When dial tone ceases and the signal on conductor 333 goes low, the trigger to timer 358 goes away, but its Q output stays high for its time cycle, about 750 ms. If the signal on conductor 333 does not again go high during this time period, indicating a return of dial tone, the timer 358 times out and its Q output goes low and triggers the single-shot timer 359, the $\overline{Q}$ output of which goes low and clears the flip-flops 337 and 346. The purpose of this trigger circuit is to avoid clearing the flip-flops 337 and 346 on momentary instabilities of dial tone.

In some telephone systems the precise dial tone frequencies used by the Bell System will not be present and, therefore, the dial tone decode circuit 330 will not respond to produce a high signal on the conductor 333. Therefore, all audio signals received by the system 30 and fed to the limiting circuit 250 (FIG. 9), are also fed to the active filter circuit 265 and, from the output thereof via the conductor 268, to the operational amplifier circuit 381 of the disconnect circuit 380 (FIG. 13). The operational amplifier circuit 381 has filter characteristics designed to pass low frequency tones in the range in which all dial tones will appear, and the output thereof is fed through the inverter 382 to the inverter 386, the resistor 384 and capacitor 385 serving to delay the falloff of the signal between the two inverters. The output of the inverter 386, which is present whenever a high level tone is continuously received by the system 30, is fed via the conductor 334 to the amplifier lock-down circuit 340 (FIG. 11), which circuit may selectively be made responsive to the signals on the conductor 334 by moving the optional switch 334a to the broken line position. Thus, amplifier lock-down can be made to occur in the presence of any dial tone, whether or not it has the precise frequency components used by the Bell System.

Reset—Tone Dialing

If the caller encounters a busy or no-answer condition, or merely wishes to place another call, he may do so without having to hang up his telephone and recall the system 30. The caller presses the "*" button and the corresponding tone is detected by the tone detectors 301 (FIG. 10) and strobed by the encoder 315 to the decoder 320 and NOR gate 321 to produce a high output signal on the conductor 322, which is fed to the AND gate 364 (FIG. 12). The other input to the AND gate 364 is the normally high $\overline{Q}$ output of the timer 362, so the output of the AND gate 364 goes high and is fed via the conductor 186 to the NOR gate 185 (FIG. 7), causing its output to go low, which in turn causes the output of the AND gate 184 to go low and trigger the timer 183. The $\overline{Q}$ output of the timer 183 goes low and is fed to the AND gate 181 as an inhibit signal, causing the output thereof to go low, thereby de-energizing the relay A2 and disconnecting the Tip and Ring conductors of the line L2 from the transformer 55. Relay A2 remains de-energized for the 2-second time period of the timer 183, and the removal of the load from the line L2 simulates "hanging up" of that line to the central office. When the timer 183 times out, its $\overline{Q}$ output returns high, causing the output of the AND gate 181 to again go high and re-energize the relay A2 to reconnect the line L2 to the transformer 55 and evoke a new dial tone on line L2, which is heard by the caller on line L1.

As the timer 183 was triggered, its low $\overline{Q}$ output was also fed via the conductor 194 to the AND gate 335 (FIG. 11), the signal acting in the same manner as did the low signal on conductor 195 in response to reception of the correct security code, for causing the amplifier lock-down circuit 340 to lock down the amplifier 60 to permit tone dialing of the new call over line L2. The caller may now dial this next call in the usual manner.

Disconnect

When the caller is finished talking, he hangs up. Within about 30 seconds, depending upon the central office serving the line L1, the central office sends a new dial tone back over that line to the system 30. This dial tone is carried via the transformer winding 56 and conductor 57 (FIG. 2) to the limiting circuit 250 and active filter circuit 265 (FIG. 9), and thence via the conductor 268 to the operational amplifier circuit 381 of the disconnect circuit 380 (FIG. 13). The output of the operational amplifier circuit 381 is fed through inverters 382 and 386 to the inverter 387, which gives a low voltage level at its output whenever a loud tone is constantly present. This signal is fed into a discrete timer circuit comprising the transistors 388, 389, 390 and 392, the timing capacitor 391 and associated components.

Essentially, the output of the inverter 387 switches off the transistor 388, causing the voltage level at its collector to rise, thereby switching off the transistor 390 and causing the transistor 389 to conduct, thereby to charge the capacitor 391 through the transistor 389. When the charge on the capacitor 391 reaches a predetermined level, the unijunction transistor 392 is gated on to feed a low voltage level to the base of the transistor 394, switching it on and producing a low voltage level at its collector, which causes the output of the inverter 395 to go high to the NOR gate 396, causing its output to go low on the conductor 196. Thus, this circuit looks for about 10 seconds of continuous dial tone input before producing an output. If the dial tone goes away before the full 10 seconds have elapsed, the timing capacitor 391 will be discharged through the transistor 390 before the charge thereon reaches a level sufficient to trigger the transistor 392, and the entire timing cycle must begin again.

After the 10 consecutive seconds of dial tone have elapsed, the low output on the conductor 196 is fed to the clear terminals of flip-flops 170 and 180 (FIG. 7), causing their Q outputs to go low, and thereby removing the high signals on conductors A1C and A2C for discharging the relays A1 and A2 and releasing the lines L1 and L2 from the system 30. It will be appreciated that the clearing of the flip-flop 170 will also serve to reset the line L4 in the event the incoming call had been made on that line, since the low output of the AND gate 166 is fed to the AND gate 177 controlling relay A4 as well as to the AND gate 165 controlling relay A1.

When the high signals on the conductors A1C and A2C are removed (FIG. 7), the outputs of the inverters 176 and 190 return to their normal high conditions and are fed to the inputs of the NAND gate 191, causing its output to go low to the OR gate 192. The other input to the OR gate 192 is the low output of the AND gate 177 and, therefore, the output of the OR gate 192 goes low to the conductor 193, indicating that all of the lines L1, L2 and L4 are disconnected. The low signal on the conductor 193 is fed to the security code circuit 200 (FIG. 8) to clear the flip-flop 222, and is fed through the AND gate 249 to clear the flip-flop 238 of the rotary/tone control circuit 240. The low signal on the conductor 193 is also fed through the AND gate 378 (FIG. 12) to clear the flip-flop 375 and through the AND gates 366 and 367 to clear the flip-flop 368. The system 30 is now ready to receive a new call.

Add-On Conference

If a caller from a tone dialing telephone has placed a call on the automatic interconnection system 30, and wants to add an additional party to the call, he may do so with the add-on conference feature. To use this feature, he places his initial call as described above, and after completing the call, he presses the "#" button on his telephone. In response to this signal, the tone decode circuit 300 (FIG. 10) produces a high output signal on the conductor 324, which is fed to the AND gate 373 (FIG. 12). The input signal to the AND gate 373 on conductor 188 is also high because line L2 is connected (see FIG. 7), as is the third input to the AND gate 373, i.e., the normally high $\overline{Q}$ output of the timer 362. Thus, the output of the AND gate 373 goes high, triggering the timer 374 and causing its $\overline{Q}$ output to go low for its time cycle, normally 1500 ms. The high output of the AND gate 373 is also fed to the clock input of the flip-flop 375, causing its Q output to go high to the AND gate 376, the other input to that gate being the $\overline{Q}$ output of the timer 374 which is now low. When the timer 374 times out after 1½ seconds, its $\overline{Q}$ output goes high, allowing the output of the AND gate 376 to go high through the buffer amplifier 377 and via the conductor A3C to the relay driver 81 (FIG. 3) for the relay A3 to energize it and close its contacts. Thus, the Tip and Ring conductors of the line L3 are connected through the contacts A3a and A3b and the coupling capacitors 65 and 66 to the subscriber side of the repeater amplifier 60, along with the Tip and Ring conductors of the line L2. The terminating network comprising the inductors 67 and 68 and resistor 69 are connected across the Tip and Ring conductors of the line L3 via the contacts A3d of the relay A3, thereby presenting an "off-hook" condition to the central office, which presents a dial tone on line L3 which is heard by the two parties on the original call.

This dial tone is detected by the dial tone decode circuit 330 which, in the usual manner, transmits a high signal on the conductor 333 to the amplifier lock-down circuit 340 (FIG. 11). Lock down of the amplifier 60 then proceeds in basically the same manner as was described above, with the exception that instead of the low output from the AND gate 335 being produced by the low signal on the conductor 195, it is gated via the conductor 336 by the low $\overline{Q}$ output of the timer 374 (FIG. 12).

While on this three-way conference call, the original caller may wish to disconnect the third party, while continuing to converse with the original party called on line L2. To do this, he simply again presses the "#" button, this tone being detected by the tone decode circuit 300, which again transmits a signal on the conductor 324 to the AND gate 383, causing the output thereof to go high, clocking the flip-flop 375 and causing it to change states, so that its Q output goes low, thereby causing the output of AND gate 376 to go low. This de-energizes the relay A3 to disconnect the line L3 from the system 30. The caller may then, if he wishes, add another third party conference caller by again pressing the "#" button and repeating the same procedure outlined above.

While the coupling and amplifier circuit 50 normally utilizes only a single repeater amplifier 60, it may, as explained above, utilize an auxiliary amplifier 70 for conference calls. In this latter case, when the relay A3 is energized, the line L3 is connected through the contacts A3a and A3b of the relay A3 to the amplifier 70 and thence to the winding 54 of the transformer 55 which, through the amplifier 70, provides the load to the line L3 for producing an "off-hook" condition thereon when the relay A3 is closed. Lock-down of the amplifier 70 is accomplished in essentially the same manner as was described above for the amplifier 60, with the difference being that lock-down is accomplished through the opto-isolator 354 to place the resistance 355 across the control conductors 71 and 72 of the amplifier 70 and lock it down to look only at line L1.

Presenting Security Code—Rotary Dialing

The caller may access the automatic interconnection system 30 from many rotary dial telephones, although the connection must be relatively noise-free, and telephones served by "E.S.S." central offices will not work. The incoming call is detected and answered in the same manner as was described above for a call from a tone dialing telephone. When the caller operates his dial to transmit the security code digits, "clicks" representing each digit he has dialed are generated. These clicks, if properly detected, shaped and counted, can be used to control the outpulse dialing relay A6 on line L2, so that the caller may dial out over line L2.

The incoming dialing clicks are fed through the transformer 55 via the conductor 57 to the limiting circuit 250 (FIG. 9) and thence to the active filter circuit 265. The operational amplifier circuits 266 and 267 of the active filter circuits 265 are configured to attenuate all but the desired frequencies where most of the energy of the dialing "clicks" is located. The output of the active filter circuit 265 is fed to the operational amplifier circuits 271 and 272 of the dial pulse detector 270 which shape the clicks into square pulses. The pulses are buffered by the transistor 273 and sent to the network of timers 274, 275 and 277 which examine the pulses for the proper time relationship therebetween. If the pulses are present at a spacing customary for "dial pulses", typically 9-11 pulses per second, they are inverted by the inverter 278 and transmitted as low signals on the conductor 233 to trigger the timer 232 of the pulse decode circuit 230 (FIG. 8). The time constant of the timer 232 is configured to duplicate the on/off ratio of a proper dial pulse.

Additionally, when the incoming call is answered, the low signal on the conductor 154 from the line identification circuit 150 is fed to the set terminal of the flip-flop 238 of the rotary/tone control circuit 240 (FIG. 8). This causes the Q output of the flip-flop 238 to go high to an input of the AND gate 237. In the case when the caller was using a tone-dialing telephone, as soon as he pressed the first digit of the security code, a low signal was generated on the conductor 218 by the tone decode circuit 300 and fed through the AND gate 439 (FIG. 15) to clear the flip-flop 421, and through the AND gate 249 (FIG. 8) to reset the flip-flop 238, causing its Q output to go low. This disabled the entire rotary dial mode. But when the caller is using a rotary dial telephone, the flip-flop 238 remains set by the low signal on conductor 154, and the high Q output thereof is fed via the conductor 239 to the dial mode control circuit 420.

As the caller dials the first digit of the security code, each "click" of the digit causes the Q output of the timer 232 to go momentarily high, and these highs are fed to the clock input of the counter 231, which counts the pulses and produces a BCD output reflecting its content, which output is sent via the conductors RA-RD to the rotary dial inputs of the data selector 210. As the signal on the conductor 239 goes high, it clocks the flip-flop 421 of the dial mode control circuit 420 (FIG. 15), causing its Q output to go high and be fed via the conductor 211 to the select terminals of the data selector 210, switching it to a mode wherein it responds to input data on the conductors RA-RD.

The $\overline{Q}$ output of the timer 232, which goes low with each dial "click", triggers the retriggerable timer 234, causing its Q output to go high with each trigger for a time period of about 600 ms., which is the minimum interdigital time interval specified by the American Telephone & Telegraph Company. Thus, when the caller finishes dialing the first digit of the security code, there will be no dial clicks sent for 600 ms., this being the time period required for the caller to pull the dial around to the next number he wishes to dial. Thus, for example, if the first security code digit is "4", when it has been dialed, the counter 231 will have counted to four, and will be transmitting a BCD representation of the digit "4" on the conductors RA-RD to the inputs of the data selector 210. Then, 600 ms. after the last pulse of the "4" has been received, the timer 234 will time out and its Q output will go low, triggering the timer 235, and causing its Q output to go high to the AND gate 237, the other input of which is also high. Therefore, the output of the AND gate 237 goes high and is fed through the NOR gate 241, causing its output to go low to strobe the data selector 210, allowing it to transfer the BCD representation of the digit "4" from its inputs to its outputs and thence to the comparators 207-209. The comparator 207 will produce a high at its A=B output in the same manner as was described above in connection with the tone dialing mode of operation.

The remaining two digits of the security code sequence are transmitted in the same manner, and the security code circuit operates in the manner described above in connection with the tone dialing mode of operation to present a high output signal on the conductor 174 when the security code has been correctly received, thereby energizing the relay A2 for connecting the line L2 to the transformer 55, all as described above.

Rotary Dialing of Outgoing Call

When line L2 is connected to the transformer 55, the caller hears the dial tone from line L2, and a high signal on the conductor 333 is generated by the dial tone decode circuit 330 in the usual manner and triggers the timer 422 of the dial mode control circuit 420, causing its $\overline{Q}$ output to go low to an input of the AND gate 423, the other input of which is normally high. Thus, when the timer 422 times out in about 2,000 ms., its $\overline{Q}$ output goes high and the output of the AND gate 423 goes high to trigger the single-shot timer 426 and cause its Q output to go high into the AND gate 427. Since the other input of the AND gate 427 is the high Q output of the flip-flop 421, which has just been clocked, the output of the AND gate 427 goes momentarily high and clocks the flip-flop 428, the Q output of which goes high to an input of the AND gate 429. The other input of the AND gate 429 is normally high, so its output goes high through the buffer amplifier 430 to the conductor A6C and thence to the relay driver 81 (FIG. 3) for the relay A6 to energize that relay and close its contacts, thereby connecting the resistance 73 (FIG. 2) across the Tip and Ring conductors of the line L2. This resistance simulates an "off-hook" condition on line L2, since in the following steps the relay A2 will be opened, disconnecting the Tip and Ring conductors thereof from the transformer 55 which has been providing the "off-hook" loading up to this point.

The high Q output of the flip-flop 428 also triggers the single-shot timer 431, the $\overline{Q}$ output of which goes low to trigger the retriggerable timer 432, and cause its $\overline{Q}$ output to go low and be fed via the conductor 182 to the input of the AND gate 181 (FIG. 7). The output of the AND gate 181 goes low through the buffer amplifier 189 to de-energize the relay A2 and disconnect the line L2 from the transformer 55, the line L2 being held in its "off-hook" condition by the resistor 73 (FIG. 2). The high Q output of the flip-flop 428 is also fed via the conductor 247 to the input of the AND gate 246 in the rotary/tone control circuit 240 (FIG. 8). With this input high, each dialing "click" of the dialed outgoing call will trigger the timer 232 and cause its Q output to go high to the other input of the AND gate 246, to cause its output to go high on the conductor 248.

Thus far, the caller has dialed into the automatic interconnection system 30, has had his call answered and has dialed in the three-digit security code. At the completion of the security code, the line L2 was connected to the transformer 55 by the relay A2, and the caller hears a dial tone from line L2 through the transformer 55 for two seconds until the timer 422 times out, after which relay A2 is opened and the caller no longer hears a dial tone, which is the signal that he can begin dialing his outgoing call.

The caller dials the first digit of the outgoing call, each dial pulse being decoded as described above and fed to the timer 232 for triggering it and causing the output of the AND gate 246 to go high with each dial pulse and be fed via the conductor 248 to the AND gate 433 (FIG. 15), the other input of which is the high Q output of the timer 432 which has been triggered by the timer 431. Thus, at each dial pulse, the AND gate 433 output goes high and retriggers the timer 432 for its full time period, approximately 4,000 ms. The high signal on the conductor 248 is also fed to the input of the NAND gate 434, causing its output to go low for the duration of each dial pulse, since the other input to the NAND gate 434 is the Q output of the timer 432 which is being maintained high. As the output of the NAND gate 434 goes low with each dial pulse, the AND gate 429 is momentarily inhibited and its output goes low through the buffer amplifier 430 to the conductor A6C to momentarily de-energize the relay A6. As relay A6 opens, the load across the Tip and Ring conductors of the line L2 is momentarily removed, simulating the opening and closing of a rotary dial switch. This process continues with each dial pulse or "click" being received and causes the relay A6 to operate as a dial switch to dial the outgoing call on the line L2.

When the caller has completed dialing the outgoing call, no further dial pulses will be decoded and when the signal on the conductor 248 and the output of the AND gate 433 remain low, the timer 432 is not retriggered and, after 4 seconds it times out, causing its $\overline{Q}$ output to return to its normal high condition, which is fed via the conductor 182 to the AND gate 181 (FIG. 7), causing its output to go high to the conductor A2C for reclosing the relay A2 and reconnecting the line L2 to the transformer 55. When the timer 432 times out, its Q output goes low through the NAND gate 434 to the AND gate 429, causing its output to go low through the buffer amplifier 430 to the conductor A6C for de-energizing the relay A6 and disconnecting the resistor 73 from the Tip and Ring conductors of the line L2.

As the output of the AND gate 181 (FIG. 7) goes high, this high is fed via the conductor 188 to trigger the single-shot timer 435 (FIG. 15), causing its $\overline{Q}$ output to go low through the AND gate 436 to clear the flip-flop 428. Thus, the Q output of the flip-flop 428 goes low and is fed via the conductor 247 to the AND gate 246 (FIG. 8), blocking passage of further dial pulses therethrough.

The caller may now converse with the called party in the usual manner. He may not use the add-on conference feature, since this is only accessible from a tone dialing telephone.

As was explained above, this entire sequence whereby the system 30 responds to a dial tone on the line L2 to close the relay A6 and open the relay A2 after two seconds of a dial tone is inhibited by a low signal on the conductor 218 from the tone decode circuit 300 in response to the first security code tone when the caller is calling from a tone dialing telephone. But when the system is operating with a "000" security code, the line L2 is immediately connected to the transformer 55 in response to the ringing signals on the line L1, and the system 30 receives no security code information to tell it whether or not to inhibit the rotary mode of operation. If the caller from a tone dialing telephone dials the first digit of the outgoing call immediately upon hearing a dial tone, the first tone digit of the outgoing call will cause the low signal to be produced on conductor 218 to inhibit the rotary mode of operation. Otherwise, if the caller waits more than 2 seconds to dial his call, the timer 422 will time out and disconnect the line L2 from the transformer 55 before the caller can dial his outgoing call.

Thus, in order to insure adequate time for the caller from a tone dialing telephone to begin the dialing of his outgoing call before the system goes into the rotary mode and line L2 is disconnected, when the system 30 is operating with no security code (a "000" code), the high output of the AND gate 221 (FIG. 8) when the incoming call is answered, sets the flip-flop 222, causing its Q output to go high on the conductor 223 to the AND gate 425 (FIG. 15). Thus, when the dial tone on line L2 appears, the high signal on conductor 333 causes the output of the AND gate 425 to go high to trigger the timer 424, causing its normally high $\overline{Q}$ output to go low for the time period of the timer 424, approximately 5,000 ms. Thus, after the two-second timer 422 times out, the output of the AND gate 423 will still not go high until the five-second timer 424 also times out. Thus, where no security code is used, the caller from a tone dialing telephone will have five seconds rather than two seconds to begin dialing his outgoing call before the line L2 will be disconnected.

Reset—Rotary Dialing

If the caller wishes to make another outgoing call on line L2, he may reset that line by dialing the digit "9". The nine dial pulses are detected and timed by the dial pulse detector 270 (FIG. 9) and counted by the decade counter 231 of the pulse decode circuit 230 (FIG. 8) in the usual manner. The decade counter 231 has a carry output which goes high when the counter has reached a count of "9", this output being fed via the conductor 244 to the input of the AND gate 243, the other input of which is the output of the timer 235 fed through the AND gate 237, which is the signal that is used to indicate that a complete digit has been dialed. Thus, the output of the AND gate 243 goes high and is fed via the conductor 245 to the AND gate 437 (FIG. 15) the other input of which is the normally high $\overline{Q}$ output of the timer 432. Thus, the output of the AND gate 437 goes high and is fed via the conductor 187 to the NOR gate 185 (FIG. 7) to operate in the same manner as the high signal on the conductor 186 (the signal generated by a caller using the tone dialing "*" reset feature) to reset the line L2. More particularly, the low output of the NOR gate 185 is fed through the AND gate 184 to trigger the two-second timer 183 for opening the relay A2 for two seconds and then reclosing it. The high signal on the conductor 187 is also inverted through the inverter 438 (FIG. 15) and sets the flip-flop 421 to set up the dial mode control circuit 420 for another rotary dial call, which is then handled in the same manner as the initial call.

When the caller is finished with his call, he hangs up and, when a dial tone reappears on line L1, the disconnect circuit 380 will detect it and cause de-energization of the relays A1 and A2 for disconnecting the lines L1 and L2 and readying the system 30 for another incoming call, in the same manner as was described above with respect to a call from a tone dialing telephone.

Call-Back/Local

This feature permits a caller, when out of town, to access the system 30 from his long distance location, have the system 30 call him back and connect him to a local line in the calling area of the base subscriber station where the system 30 is located. This allows the caller to make repeated calls to his home office area for the cost of a minimum time long distance call from his calling location to his home office.

To use this feature, the caller must be calling from a tone dialing telephone. He dials the telephone number of the line L1, utilizing the necessary area code, and this call is answered by the system 30 just as any other incoming call. The caller then dials in the three-digit-security code in the usual manner. After entering the security code (or immediately after answering of the call if the "000" code is used), the caller will hear a dial tone from line L2, and lock-down of the amplifier 60 will occur in the usual manner. Upon hearing a dial tone from line L2, the caller dials the number of the telephone from which he is calling, complete with its area code, and then hangs up his telephone. He has, in effect, called himself, and the long distance telephone network starts processing his call and routing it from the location of the system 30 to his calling location. Because the caller has hung up his telephone, the call be has made to himself will not reach a busy line and, about 5 to 10 seconds after he hangs up, his phone will ring. This will be the system 30 calling him back. He picks up the telephone and will hear a silent line.

The caller immediately presses the "0" button. This tone is detected by the tone detectors 301 (FIG. 10), which cause the encoder 315 to transmit a BCD representation of the tone to the decoder 320, which outputs a signal to the NOR gate 325, which cooperates with the NOR gate 326 to hold the output of the NOR gate 325 high as long as the "0" tone is present. The high output signal on the conductor 327 is fed to one input of the AND gate 361 (FIG. 12) whose other input is the normally high oscillator output on the conductor 357, the oscillator operating at approximately 1,000 Hz. Thus, the high signal on conductor 327, which is a voltage level, is turned into a series of pulses at the output of the AND gate 361 for as long as the "0" tone is present. The output of the AND gate 361 triggers the retriggerable timer 362, the Q output of which goes high for about 1500 ms. to an input of the AND gate 363.

The caller next immediately presses the "*" button before the timer 362 times out and, in response to this tone, the tone decode circuit 300 generates a high signal on the conductor 322 which is fed to the other input of the AND gate 363, causing its output to go high on the conductor 162. The signal on the conductor 162 triggers the timer 171 (FIG. 7), causing its $\overline{Q}$ output to go low to inhibit the NAND gate 169 and cause its output to go high to the input of the NAND gate 168. Thus, the output of the NAND gate 168 goes low through the AND gates 166 and 165 and the buffer amplifier 175 to the conductor A1C, for de-energizing the relay A1 and disconnecting the line L1 from the tranformer 55. When the timer 171 times out, after approximately 2,000 ms., its $\overline{Q}$ output returns high, causing the output of the NAND gate 169 to go low and, through the gates 168, 166 and 165, causes re-energization of the relay A1, for reconnecting the line L1 to the transformer 55 to evoke a new dial tone on line L1. The caller hears this new dial tone via the transformer 55 and the line L2.

Before the caller can transmit tone dialing signals via the line L2 and use them to dial an outgoing call on line L1, the amplifier 60 must be locked down to ignore the dial tone on line L1 and look to the incoming dialing signals on line L2. Thus, as the high output signal on conductor 162 is generated by the AND gate 363 (FIG. 12), it is fed to the input of the NOR gate 347 (FIG. 11), causing its output to go low to set the flip-flop 346, the Q output of which goes high to the NAND gate 345. The other input to the NAND gate 345 is the high signal on the conductor 333 which is generated in response to the dial tone by the dial tone decode circuit 330. Thus, the output of the NAND gate 345 goes low to the inverter 351, the output of which goes high to turn on the opto-isolator 354, the photoresistor of which conducts to place the resistance 353 across the control conductors 61 and 62 of the repeater amplifier 60, locking it down in a condition to look toward the line L2.

The caller now dials the number he wishes to call and, after the first digit has been tone dialed, the central office will break the dial tone, whereupon the high signal on the conductor 333 will disappear, causing the output of the NAND gate 345 to go high and turn off the opto-isolator 352, permitting the amplifier 60 to return to its normal two-way mode of operation.

After completing his call, the caller can reset the line L1 and place additional calls thereon without having to hang up and place an additional call to the system 30. To do this, the caller simply again presses "0" and then "*". As outlined above, this will again cause the relay A1 to momentarily reopen and then reclose, to bring up a new dial tone on the line L1. The caller may then dial his next call.

After the caller has completed as many calls as he wants, he hangs up his telephone, and the disconnect circuit 380 will be triggered by a return dial tone on the line L2 to reset the system 30 in the usual manner.

Call-Back/Long Distance

This feature allows a caller from a tone dialing telephone to perform the call-back/local function as described in the preceding section, with the difference being that instead of being connected to a local line such as line L1, the caller may optionally be connected to another long distance line. For this purpose, a second long distance line such as a WATS line may be connected to the system 30 as line L3. In this way, a caller who is out of town may call long distance into the system 30 on line L1, and have the system 30 call him back on line L2 just as was described in the preceding section. He may then be connected to a second WATS line and may make repeated calls over this second WATS line.

To use this call-back/long distance feature, the caller proceeds exactly in the same manner as set forth above for the call-back/local feature. After the system 30 calls him back, instead of pressing "0" and "*" to reset line L1, the caller presses the "0" and "" buttons. As he presses the "0", the Q output of the timer 362 (FIG. 12) goes high, as explained in the proceding section, and is fed to an input of the AND gate 372. As the caller presses the "" button, the tone decode circuit 300 responds to this tone to generate a high output signal on the conductor 324 (FIG. 10), which is fed to the other input of the AND gate 372, causing its output to go high to clock the flip-flop 368. The $\overline{Q}$ output of the flip-flop 368 goes low and is fed via the conductor 167 to an input of the AND gate 166 (FIG. 7), causing its output to go low and, through the AND gate 165 and buffer amplifier 175, cause the signal on the conductor A1C to go low for de-energizing the relay A1 and disconnecting line L1 from the transformer 55.

The high output signal from the AND gate 372 also triggers the timer 371, causing its $\overline{Q}$ output to go low for its time period of about 2,000 ms. to an input of the AND gate 369. The other input of the AND gate 369 is the Q output of the flip-flop 368 which has been triggered high as described above. Thus, after the timer 371 times out, the $\overline{Q}$ output thereof returns high, causing the output of the AND gate 369 to go high through the buffer amplifier 370 to the conductor A5C, for energizing the relay A5 and connecting the Tip and Ring conductors of the line L3 to the winding 51 of the transformer 55, in place of the line L1. Thus, the caller from line L2 hears a dial tone from line L3 through the transformer 55 and the amplifier 60.

The high output of the AND gate 372 is also fed via the conductor 349 to the input of the NOR gate 347 (FIG. 11) to act in the same manner as did the signal on conductor 162 in the call-back/local mode of operation described above, for locking down the amplifier 60 to receive dialing signals from the line L2. The caller then dials his call and completes it in the usual manner.

Should the caller wish to make additional calls on line L3, he simply again presses "0" and "" and this will again momentarily reopen the relay A5 as the Q output of timer 371 goes low and then reclose it when the timer 371 times out in the manner described above for evoking a new dial tone on the line L3. If the caller wishes, he may switch back and forth between the call-back/local and the call-back/long distance modes of operation by selectively pressing either "0*" to reset line L1 or pressing "0#" to reset line L3.

When the caller is finished making calls, he hangs up his telephone and the system 30 will be reset by the disconnect circuit 380 in the usual manner.

Indication of Caller Waiting

If a caller to the system 30 encounters a busy signal when calling line L1, this means that someone else is using the system 30. It is an important feature of this invention that the caller may then place a short "beep" or audible signal on the call in progress through the system 30, indicating to the users thereof that someone else is waiting to use the system 30. To use this feature, the caller dials the incoming line L1 (or L4) and, after hearing the busy signal, he hangs up his telephone, picks it up again and dials the number of line L3. The ringing signals on line L3 are detected by the ring detector 410 of the "BEEP" circuit 400 (FIG. 14), which triggers the timer 402, causing its output to go high and be fed to an input of the AND gate 403, the other input of which is the output of the oscillator 404. Thus, for the two-second time period of the timer 402, the output of the AND gate 403 will be high and be fed via the buffer amplifier 405 and conductor 79 to the base of the transistor 75 (FIG. 2), causing it to conduct and impressing an audible signal on the transformer 55 via the winding 52 thereof, in a manner previously described. This audible signal will be superimposed on whatever conversation is in progress through the system 30, notifying the users that a caller is waiting.

It is desirable to control the frequency with which a caller may induce the audible signal onto the conversation in progress, so that it does not become annoying. Thus, as the ring detector 410 triggers the timer 402, it also triggers the timer 411, causing its Q output to go high for a period of about one second. At the end of this period, the Q output of the timer 411 goes low and triggers the timer 412, the output of which goes high and, after inversion by the inverter 413, resets the timer 402 to prevent it from being triggered to produce another audible signal. After about 200 seconds, the timer 412 times out, its output goes low and the reset to the timer 402 is removed. Now, when another call comes in on line L3, the cycle may be repeated for introducing another audible signal onto the conversation in progress. In this manner, it is insured that the conversation in progress cannot be interrupted by an audible signal more than approximately once every 3½ minutes.

When the timer 402 is gated on, its high output is also fed to an input of the NAND gate 414, the other input of which is normally high, so the output of the NAND gate 414 goes low and is inverted by the inverter 415 to turn on the opto-isolator 416, the photo-resistor of which conducts to momentarily place the resistance 417 across the Tip and Ring conductors of the line L3 to, in effect, "answer" the call thereon. This answering of the call may serve as an indication to the caller (by reason of the termination of the ring-back signals) that his call has gotten through. In addition, the telephone company may require that the call on line L3 be answered so that it may derive revenue from the call.

It will be noted that in the call-back mode of operation, after the caller calls himself back and hangs up his telephone at his remote location, the central office on line L1 will, in some telephone systems, occasionally return a dial tone on line L1 before the return call can get through to the distant caller. In this case, when the caller answers the call-back call, he will hear the dial tone on line L1 and, since the amplifier 60 is in its normal two-way mode of operation, it would normally block the transmission of the control signals "0*" or "0#" from the remote caller to the system 30.

Therefore, the amplifier 60 must be locked down to amplify signals from the line L2. In the absence of reset signals (* or #), the $\overline{Q}$ output of the flip-flop 337 (FIG. 11) is normally high and is fed to the input of the NAND gate 348. When dial tone appears, the signal on conductor 333 goes high to the other input of the NAND gate 348, causing its output to go low through the inverter 351 to actuate the opto-isolator 352 to lock down the amplifier 60 in the manner described above. As soon as the first control tone signals are transmitted, the dial tone is interrupted and the high signal is removed from conductor 333, causing the output of the NAND gate 348 to go high and turn off the opto-isolator 352, permitting the amplifier 60 to return to its normal two-way mode of operation. The operation of the system 30 in response to the tone control signals and the subsequent placing of outgoing calls on the line L1 then proceeds in exactly the same manner as was described above for either call-back/local or call-back/long distance operation.

While the electronic portions of the system 30 have been described as primarily consisting of integrated circuits, it will be understood that other types of solid state or vacuum tube circuitry performing the same functions could be utilized. Furthermore, while the system 30 of the present invention has been described as operating with four telephone lines connected thereto, it will be understood that the system could be modified to operate with any desired number of lines. It will also be appreciated that the several functions of the present invention which are designed to be operated only from a tone dialing telephone, could also be operated from a rotary dial telephone by the use of a portable tone generator to simulate the standard dialing tones of the telephone system.

From the foregoing, it can be seen that there has been provided a novel system for affording access to and control of a WATS line or other long distance line serving a base subscriber station from a location remote from that station.

More particularly, there has been provided a unique system for permitting repeated calls to be placed over a long distance line or a local line serving the base station from any remote location, local or long distance, all for the price of a single telephone call to the system at the base station.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. An automatic interconnection system for use at a telephone subscriber station served by first and second subscriber lines each connected to a telephone system central office, said interconnection system comprising line interconnection means coupled to the first and second lines and operable for seizing and releasing the lines and establishing interconnections therebetween, access means coupled to the first line and to said line interconnection means and responsive to access signals on the first line for causing said line interconnection means to seize the first and second lines and establish an interconnection therebetween, and reset means coupled to the second line and to said line interconnection means and responsive to reset signals on the second line for causing said line interconnection means to release only the first line and then to re-seize the first line and reestablish the interconnection between the first and second lines.

2. The automatic interconnection system set forth in claim 1, wherein said reset means is adapted to be responsive to tone-dialing type reset signals.

3. The automatic interconnection system set forth in claim 1, wherein said reset means includes timing means responsive to the reset signals on the second line for causing said line interconnection means to disconnect the first line and then to reconnect the first line a predetermined time period after disconnection sufficient to insure release of the first line and the presentation of a dial tone thereon by the central office thereof.

4. The automatic interconnection system set forth in claim 1, and further including disconnection means coupled to the interconnected first and second lines through said line interconnection means and responsive to a dial tone appearing on either of the lines for a predetermined time period for causing said line interconnection means to release both of the first and second lines.

5. The automatic interconnection system set forth in claim 1, wherein said line interconnection means includes a multiple-winding audio transformer having two line windings respectively adapted to be coupled to the first and second lines and a control winding coupled to said access means and to said reset means, each of said line windings having an impedance such that when it is connected to the associated line it presents an off-hook condition to the associated central office for seizing the line, and switching means connected to the first and second lines and to said line windings and coupled to said access means and to said reset means for actuation thereby to effect the connection of the lines to and the disconnection of the lines from the associated ones of said line windings.

6. An automatic interconnection system for use at a telephone subscriber station served by first and second subscriber lines each connected to a telephone system central office, said interconnection system comprising line interconnection means coupled to the first and second lines and operable for seizing and releasing the lines and establishing interconnections therebetween, system access means coupled to the first line and to said line interconnection means and responsive to telephone ringing signals on the first line for causing said line interconnection means to seize the first line, line access means coupled to the seized first line through said line interconnection means and responsive to line access signals on the first line for causing said line interconnection means to seize the second line and establish an interconnection between the first and second lines, and reset means coupled to the second line and to said line interconnection means and responsive to reset signals on the second line for causing said line interconnection means to release only the first line and then to re-seize the first line and reestablish the interconnection between the first and second lines.

7. The automatic interconnection system set forth in claim 6, wherein said line access means and said reset means are adapted to be responsive respectively to tone-dialing type line access and reset signals.

8. The automatic interconnection system set forth in claim 6, wherein said line access means is adapted to be responsive to pulse-dialing type line access signals.

9. The automatic interconnection system set forth in claim 6, wherein said line access means is adapted to be responsive to either tone-or pulse-dialing type line access signals.

10. The automatic interconnection system set forth in claim 6, wherein said line access means includes code control means responsive to line access signals corresponding to a predetermined code for effecting response of said line access means, tone signal detecting means connected to said code control means and coupled to the seized first line through said line interconnection means for detecting tone-dialing type line access signals and transmitting them to said code control means, and pulse signal detecting means connected to said code control means and coupled to the seized first line through said line interconnection means for detecting pulse dialing-type line access signals and transmitting them to said code control means.

11. The automatic interconnection system set forth in claim 6, wherein said line interconnection means includes a multiple-winding audio transformer having two line windings respectively adapted to be coupled to the first and second lines and a control winding coupled to said line access means and to said reset means, each of said line windings having an impedance such that when it is connected to the associated line it presents an off-hook condition to the associated central office for seizing the line, and switching means connected to the first and second lines and to said line windings and coupled to said access means and to said reset means for actuation thereby to effect the connection of the lines to and the disconnection of the lines from the associated ones of said line windings.

12. An automatic interconnection system for use at a telephone subscriber station served by first and second and third subscriber lines each connected to a telephone system central office, said interconnection system comprising line interconnection means coupled to the first and second and third lines and operable for seizing and releasing the lines and establishing interconnections therebetween, access means coupled to the first line and to said line interconnection means and responsive to access signals on the first line for causing said line interconnection means to seize the first and second lines and establish an interconnection therebetween, and line transfer means coupled to the second line and to said line interconnection means and responsive to reset signals on the second line while the second line is connected to the first line for causing said line interconnection means to release only the first line and to seize the third line and establish an interconnection between the second and third lines, said line transfer means including reset means responsive to said reset signals on the second line while the second line is connected to the third line for causing said line interconnection means to release only the third line and then to re-seize the third line and reestablish the interconnection between the second and third lines.

13. The automatic interconnection system set forth in claim 12, wherein said line transfer means and said reset means are adapted to be responsive to tone dialing-type reset signals.

14. An automatic interconnection system for use at a telephone subscriber station served by first and second and third subscriber lines each connected to a telephone system central office, said interconnection system comprising line interconnection means coupled to the first and second and third lines and operable for seizing and releasing the lines and establishing interconnections therebetween, access means coupled to the first line and to said line interconnection means and responsive to access signals on the first line for causing said line interconnection means to seize the first and second lines and establish an interconnection therebetween, first line transfer means coupled to the second line and to said line interconnection means and responsive to first reset signals on the second line while the second line is connected to the first line for causing said line interconnection means to release only the first line and to seize the third line and establish an interconnection between the second and third lines, said first line transfer means including first reset means responsive to the first reset signals on the second line while the second line is connected to the third line for causing said line interconnection means to release only the third line and then to re-seize the third line and reestablish the interconnection between the second and third lines, and second line transfer means coupled to the second line and to said line interconnection means and responsive to second reset signals on the second line while the second line is connected to the third line for causing said line interconnection means to release only the third line and to seize the first line and establish an interconnection between the first and second lines, said second line transfer means including second reset means responsive to the second reset signals on the second line while the second line is connected to the first line for causing said line interconnection means to release only the first line and then to re-seize the first line and reestablish the interconnection between the first and second lines.

15. The automatic interconnection system set forth in claim 14, wherein each of said first and second line transfer means and said first and second reset means is adapted to be responsive to tone dialing-type reset signals.

16. An automatic interconnection system for use at a telephone subscriber station served by first and second and third subscriber lines each connected to a telephone system central office, said interconnection system comprising line interconnection means coupled to the first and second and third lines and operable for seizing and releasing the lines and establishing interconnections thereamong, access means coupled to the first line and to said line interconnection means and responsive to access signals on the first line for causing said line interconnection means to seize the first and second lines and establish an interconnection therebetween, and conference circuit means coupled to the first line and to said line interconnection means and responsive to conference signals on the first line while the first line is connected to the second line for causing said line interconnection means to seize the third line and establish a conference interconnection among the first and second and third lines, said conference circuit means including reset means responsive to the conference signals on the first line while the third line is interconnected in conference with the first and second lines for causing said line interconnection means to release only the third line.

17. The automatic interconnection system set forth in claim 16, wherein said conference circuit means and said reset means are adapted to be responsive to tone dialing-type reset signals.

18. The automatic interconnection system set forth in claim 16, and further including second reset means coupled to the first line and to said line interconnection means and responsive to second reset signals on the first line while the first line is connected to the second line for causing said line interconnection means to release only the second line and then to re-seize the second line and reestablish the interconnection between the first and second lines.

19. The automatic interconnection system set forth in claim 16, and further including disconnection means coupled to the interconnected first and second and third lines through said line interconnection means and responsive to a dial tone appearing on any of the lines for a predetermined time period for causing said line interconnection means to release all of the lines.

20. An automatic interconnection system for use at a telephone subscriber station served by two incoming subscriber lines and an outgoing subscriber line each connected to a telephone system central office, said interconnection system comprising line interconnection means coupled to the incoming lines and the outgoing line and operable for seizing and releasing the lines and establishing interconnections therebetween, access means coupled to the incoming lines and to said line interconnection means and responsive to access signals on either of the incoming lines for causing said line interconnection means to seize the outgoing line and the incoming line presenting the access signals and to establish an interconnection therebetween, and disable means coupled to said line interconnection means and to said access means and operative while the outgoing line is connected to one of the incoming lines for preventing said access means from responding to access signals on the other incoming line.

21. The automatic interconnection system set forth in claim 20, wherein the telephone subscriber station is served by a second outgoing subscriber line connected to a telephone system central office, said line interconnection means being coupled to the second outgoing line, said interconnection system further including conference circuit means coupled to each of the incoming lines and to said line interconnection means and responsive to conference signals on either of the incoming lines while that incoming line is connected to the first outgoing line for causing said line interconnection means to seize the second outgoing line and establish a conference interconnection among the incoming line and the two outgoing lines, said conference circuit means including reset means responsive to the conference signals on the incoming line while the second outgoing line is interconnected in conference with the incoming line and the first outgoing line for causing said line interconnection means to release only the second outgoing line.

22. An automatic interconnection system for use at a telephone subscriber station served by two subscriber lines each connected to a telephone system central office, said interconnection system comprising line interconnection means adapted to be coupled to each of the two subscriber lines for establishing an interconnection therebetween, said interconnection means including a two-way switched-gain repeater amplifier adapted to be coupled to each of the two lines and being operable in a normal two-way condition and in two one-way conditions, said amplifier in the normal two-way condition thereof amplifying the higher-amplitude one of two oppositely-directed signals applied simultaneously thereto and attenuating the other of said two signals, said amplifier in each of the one-way conditions thereof respectively amplifying only signals received from a corresponding one of the two lines and attenuating signals received from the other line, and amplifier control means coupled to the two lines and to said amplifier and responsive to a dial tone on either one of the two lines for switching said amplifier to the one-way condition thereof wherein it amplifies only signals received from the other line thereby to accommodate transmission of dialing signals from the other line to the one line.

23. The automatic interconnection system set forth in claim 22, wherein one side of said amplifier is connected to one of the two lines, said interconnection means further including a multiple-winding audio transformer having two line windings respectively adapted to be coupled to the other side of said amplifier and to the other line and a control winding coupled to said amplifier control means for providing an audio path between said amplifier control means and each of said line windings, each of said line windings having an impedance such that when it is connected to the associated line it presents an off-hook condition to the associated central office for seizing the line.

24. The automatic interconnection system set forth in claim 22, wherein said amplifier control means includes timing means to prevent response of said amplifier control means to a dial tone of less than a predetermined duration.

25. The automatic interconnection system set forth in claim 22, wherein said amplifier control means causes said amplifier to return to the normal two-way condition thereof in the absence of a dial tone.

26. The automatic interconnection system set forth in claim 22, and further including disconnection means coupled to the interconnected lines through said line interconnection means and responsive to a continuous dial tone of greater than a predetermined duration on either of the lines for causing said line ineterconnection means to release both of the lines.

27. An automatic interconnection system for use at a telephone subscriber station served by two subscriber lines each connected to a telephone system central office, said interconnection system comprising line interconnection means adapted to be coupled to each of the two subscriber lines for establishing an interconnection therebetween, said interconnection means including a two-way switched-gain repeater amplifier adapted to be coupled to each of the two lines and being operable in a normal two-way condition and in two one-way conditions, said amplifier in the normal two-way condition thereof amplifying the higher-amplitude one of two oppositely-directed signals applied simultaneously thereto and attenuating the other of said two signals, said amplifier in each of the one-way conditions thereof respectively amplifying only signals received from a corresponding one of the two lines and attenuating signals received from the other line, amplifier control means coupled to the two lines and to said amplifier and responsive to a dial tone on either one of the two lines for switching said amplifier to the one-way condition thereof wherein it amplifies only signals received from the other line thereby to accommodate transmission of dialing signals from the other line to the one line, access means coupled to the first line and to said line interconnection means and responsive to access signals on the first line for causing said line interconnection means to seize the first and second lines and establish an interconnection therebetween thereby to evoke a dial tone on the second line, said amplifier control means being responsive to the dial tone on the second line for switching said amplifier to a one-way condition thereof to accommodate the passage of dialing signals from the first line to the second line, and reset means coupled to the second line and to said line interconnection means and responsive to reset signals on the second line for causing said line interconnection means to release only the first line and then to re-seize the first line and reestablish the interconnection between the first and second lines thereby to evoke a dial tone on the first line, said amplifier control means being responsive to the dial tone on the first line for switching said amplifier to a one-way condition thereof to accommodate transmission of dialing signals from the second line to the first line.

28. An automatic interconnection system for use at a telephone subscriber station served by first and second and third subscriber lines each connected to a telephone system central office, said interconnection system comprising line interconnection means coupled to the first and second lines and responsive to interconnection signals on the first line for seizing the first and second lines and establishing an interconnection therebetween, and signaling means coupled to the third line and to said line interconnection means and responsive to telephone ringing signals on the third line while the first and second lines are interconnected for applying an audible signal to the first and second lines.

29. The automatic interconnection system set forth in claim 28, wherein said line interconnection means is coupled to the third line and is responsive to ringing signals on the third line for seizing the third line.

30. The automatic interconnection system set forth in claim 28, wherein said signaling means includes timing means responsive to operation of said signaling means in producing an audible signal for disabling said signaling means for a predetermined time period.

31. The automatic interconnection system set forth in claim 28, wherein said line interconnection means is coupled to the third line, said interconnection system further including conference circuit means coupled to the first line and to said line interconnection means and responsive to conference signals on the first line while the first line is connected to the second line for causing said line interconnection means to seize the third line and establish a conference interconnection among the first and second and third lines, said conference circuit means including reset means responsive to the conference signals on the first line while the third line is interconnected in conference with the first and second lines for causing said line interconnection means to release only the third line.

32. An automatic interconnection system for use at a telephone subscriber station served by first and second subscriber lines each connected to a telephone system central office, said interconnection system comprising line interconnection means coupled to the first and second lines and operable for seizing and releasing the lines and establishing interconnections therebetween, access means coupled to the first line and to said line interconnection means and responsive to access signals on the first line for causing said line interconnection means to seize the first and second lines and establish an interconnection therebetween, and line reset means coupled to the first line and to said line interconnection means and responsive to a predetermined sequence of dialing-type pulses on the first line while the first and second lines are interconnected for causing said line interconnection means to release only the second line and then to re-seize the second line and reestablish the interconnection between the first and second lines.

33. The automatic interconnection system set forth in claim 32, wherein said access means includes pulse signal detecting means for rendering said access means responsive to pulse dialing-type access signals.

34. The automatic interconnection system set forth in claim 32, wherein said line reset means is adapted to be responsive to a dialing-type pulse representation of a predetermined digit.

35. The automatic interconnection system set forth in claim 32, and further including line-holding means coupled to the second line and to said line interconnection means and responsive to a dial tone on the second line for terminating the second line with a line-holding impedance and after a predetermined time period disconnecting the second line from the first line.

36. The automatic interconnection system set forth in claim 35, and further including dialing means coupled to the first line and to said line-holding means when said line-holding means is holding the second line and responsive to dialing pulses on the first line for causing said line-holding means to intermittently disconnect the line-holding impedance from the second line to reproduce the dialing pulses on the second line.

37. An automatic interconnection system for use at a telephone subscriber station served by two subscriber lines each connected to a telephone system central office, said interconnection system comprising line interconnection means coupled to the two lines and operable to seize the lines and establish an interconnection therebetween, access means coupled to one of the lines and to said line interconnection means and responsive to access signals on the one line for causing said line interconnection means to seize the one line, code control means coupled to the one line through said line interconnection means and responsive to a predetermined sequence of code signals on the one line for causing said line interconnection means to seize the other line and establish an interconnection between the two lines, and key-controlled switch means coupled to said code control means and having a locked condition and an unlocked condition, said switch means in the unlocked condition thereof permitting alteration of the predetermined sequence of code signals to which said code control means will be responsive, said switch means in the locked condition thereof preventing alteration of the predetermined sequence of code signals to which said code control means will be responsive.

38. The automatic interconnection system set forth in claim 37, wherein said code control means is selectively operable in a bypass mode for causing said line interconnection means to seize the other line and establish an interconnection between the two lines immediately upon seizure of the one line in response to the access signals.

39. The automatic interconnection system set forth in claim 37, wherein said switch means includes a code comparison means for storing the predetermined access code and comparing incoming code signals therewith for identifying the predetermined sequence of code signals, and a plurality of manually-operated switches coupled to said code comparison means for selectively altering the predetermined code stored therein, said switch means in the unlocked condition thereof permitting alteration of the predetermined code stored in said code comparison means, said switch means in the locked condition thereof preventing alteration of the predetermined code stored in said code comparison means.

40. The automatic interconnection system set forth in claim 37, wherein said code control means is adapted to be responsive to either tone or pulse dialing-type code signals.

41. The automatic interconnection system set forth in claim 37, and further including timing means coupled to said code control means for preventing actuation of said line interconnection means by said code control means unless the predetermined sequence of code signals is received by the code control means within a predetermined time period.

42. An automatic interconnection system for use at a telephone subscriber station served by three subscriber lines each connected to a telephone system central office, said interconnection system comprising line interconnection means coupled to each of the three subscriber lines and operable for seizing and releasing the lines and establishing interconnections therebetween, and line transfer means coupled to a first one of the subscriber lines and to said line interconnection means and responsive to transfer signals on the first line while it is connected to a second one of the subscriber lines for causing said line interconnection means to release the second line and to seize the third one of the subscriber lines and establish an interconnection between the first and third lines.

43. The automatic interconnection system set forth in claim 42, wherein said line transfer means includes reset means responsive to reset signals on the first line while it is connected to the third line for causing said line interconnection means to release the third line and then to reseize the third line and reestablish the interconnection between the first and third lines.

44. An automatic interconnection system for use at a telephone subscriber station served by three subscriber lines each connected to a telephone system central office, said interconnection system comprising line interconnection means coupled to each of the three subscriber lines and operable for seizing and releasing the lines and establishing interconnections therebetween, first line transfer means coupled to a first one of the subscriber lines and to said line interconnection means and responsive to first transfer signals on the first line while it is connected to a second one of the subscriber lines for causing said line interconnection means to release the second line and to seize the third one of the subscriber lines and establish an interconnection between the first and third lines, and second line transfer means coupled to the first line and to said line interconnection means and responsive to second transfer signals on the first line while it is connected to the third line for causing said line interconnection means to release the third line and to seize the second line and establish an interconnection between the first and second lines.

45. The automatic interconnection system set forth in claim 44, wherein said first line transfer means includes first reset means responsive to first reset signals on the first line while it is connected to the third line for causing said line interconnection means to release the third line and to re-seize the third line and reestablish the interconnection between the first and third lines, said second line transfer means including second reset means responsive to second reset signals on the first line while it is connected to the second line for causing said line interconnection means to release the second line and then to re-seize the second line and reestablish the interconnection between the first and second lines.

* * * * *